United States Patent [19]
Lepper et al.

[11] Patent Number: 5,844,802
[45] Date of Patent: Dec. 1, 1998

[54] PRODUCTION LINE TRACKING AND QUALITY CONTROL SYSTEM

[75] Inventors: John Mark Lepper; Ravi Sankar Sanka; Craig William Walker; Daniel Tsu-Fang Wang, all of Jacksonville, Fla.

[73] Assignee: Johnson & Johnson Vision Products, Inc., Jacksonville, Fla.

[21] Appl. No.: 865,437

[22] Filed: May 29, 1997

Related U.S. Application Data

[63] Continuation of Ser. No. 720,897, Oct. 7, 1996, abandoned, which is a continuation of Ser. No. 582,269, Jan. 3, 1996, abandoned, which is a continuation of Ser. No. 257,790, Jun. 10, 1994, Pat. No. 5,555,504.

[51] Int. Cl.[6] .................................................. G06F 19/00
[52] U.S. Cl. ........................ 364/468.22; 364/468.16; 364/468.24; 364/475.02
[58] Field of Search ..................... 364/468.01, 468.05, 364/468.07, 468.08, 468.22, 468.16, 468.17, 468.23, 468.24, 478.01, 478.13, 475.02, 525, 131–136; 198/349, 349.1; 264/1.1, 1.6, 2.6, 40.1; 425/808, 162, 169; 702/182, 84, 187, 188

[56] References Cited

U.S. PATENT DOCUMENTS

| | | |
|---|---|---|
| 4,669,047 | 5/1987 | Chucta . |
| 4,980,993 | 1/1991 | Umezaki ...................... 451/5 |
| 5,080,839 | 1/1992 | Kindt-Larsen ............... 264/2.6 |
| 5,255,197 | 10/1993 | Iida ............................. 364/468 |
| 5,268,849 | 12/1993 | Howlett et al. ............. 364/478 |
| 5,321,619 | 6/1994 | Matsuda et al. ............ 364/468 |
| 5,347,463 | 9/1994 | Nakamura et al. ......... 364/478 |
| 5,434,790 | 7/1995 | Saka et al. .............. 364/468.23 X |

*Primary Examiner*—Joseph Ruggiero

[57] ABSTRACT

A production line tracking and quality control system and method thereof comprises a series of pallets for carrying one or more first contact lens mold halves or one or more complementary second contact lens mold halves throughout a contact lens fabrication facility. Each pallet of the series is transported on a conveyor device throughout the fabrication facility, and each pallet includes a unique identifying code. The fabrication facility includes one or more process stations and a control device provides real time monitoring of contact lens fabrication processes at the one or more process stations. The control device further includes a tracking device for identifying the unique code of each of the pallets at one or more process stations while continually receiving monitored process condition values at each station. For each identified pallet, the control device generates process status information for memory storage in the form of a reject flag, when the process conditions are out of predetermined limits, or, an acceptance flag indicating that process conditions are within predetermined limits. The process status information is updated when the pallets are identified and the status of each pallet is checked when entering or exiting a process station.

15 Claims, 22 Drawing Sheets

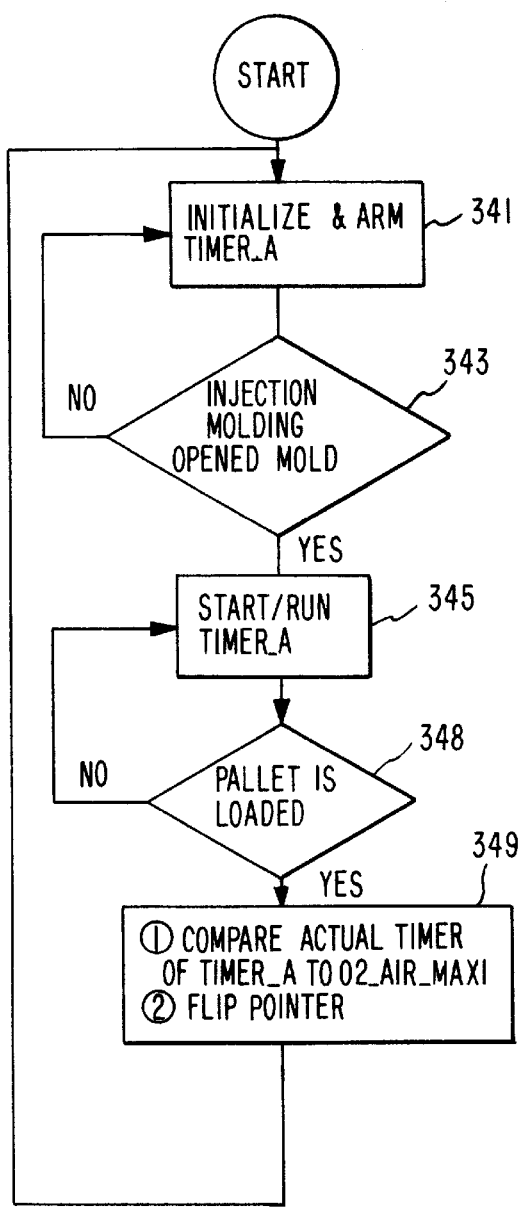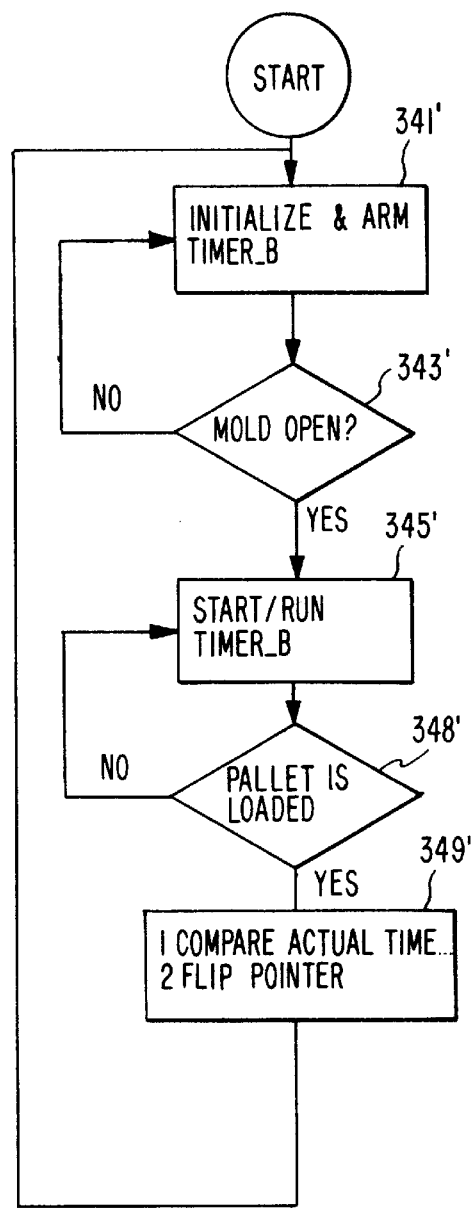

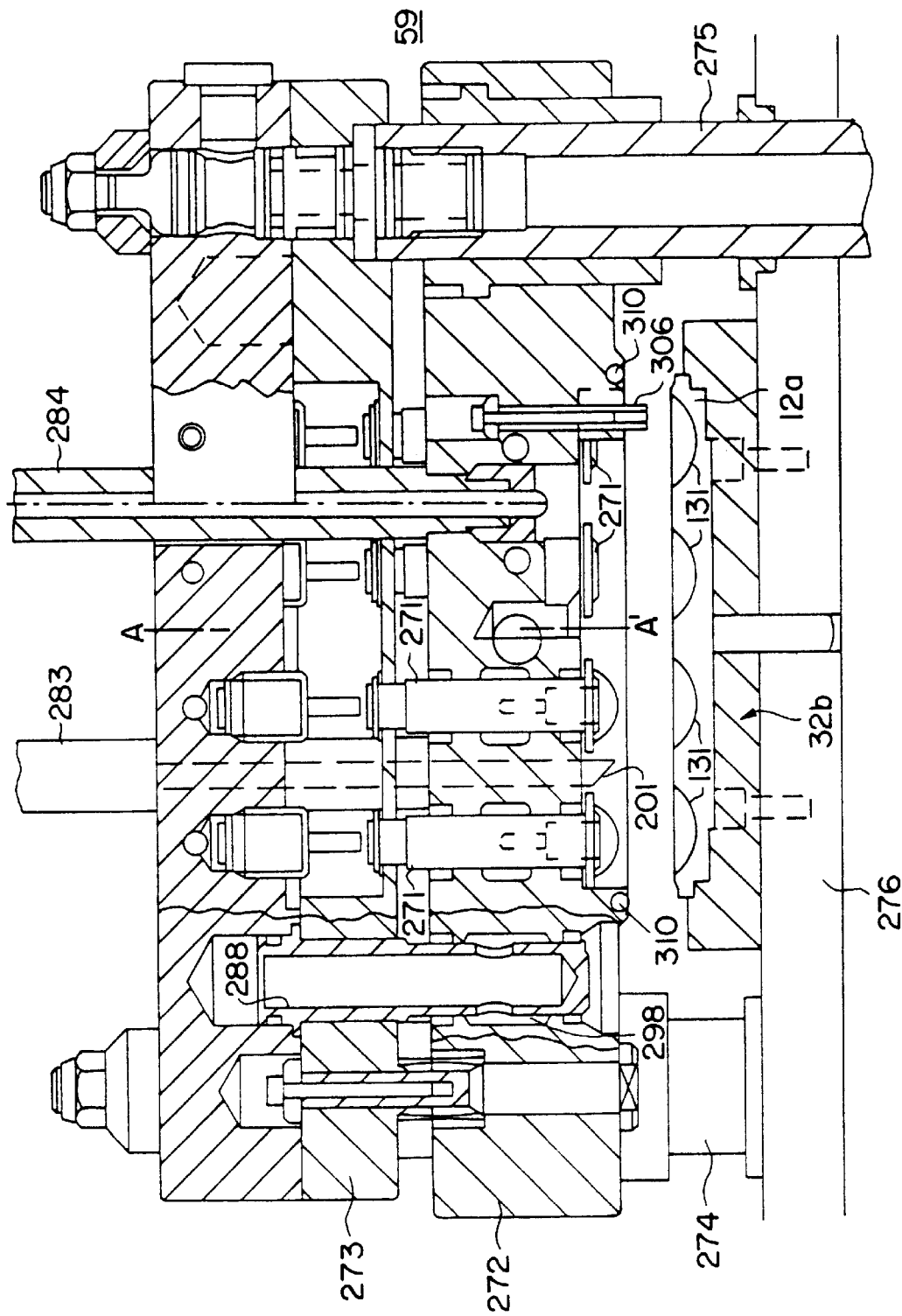

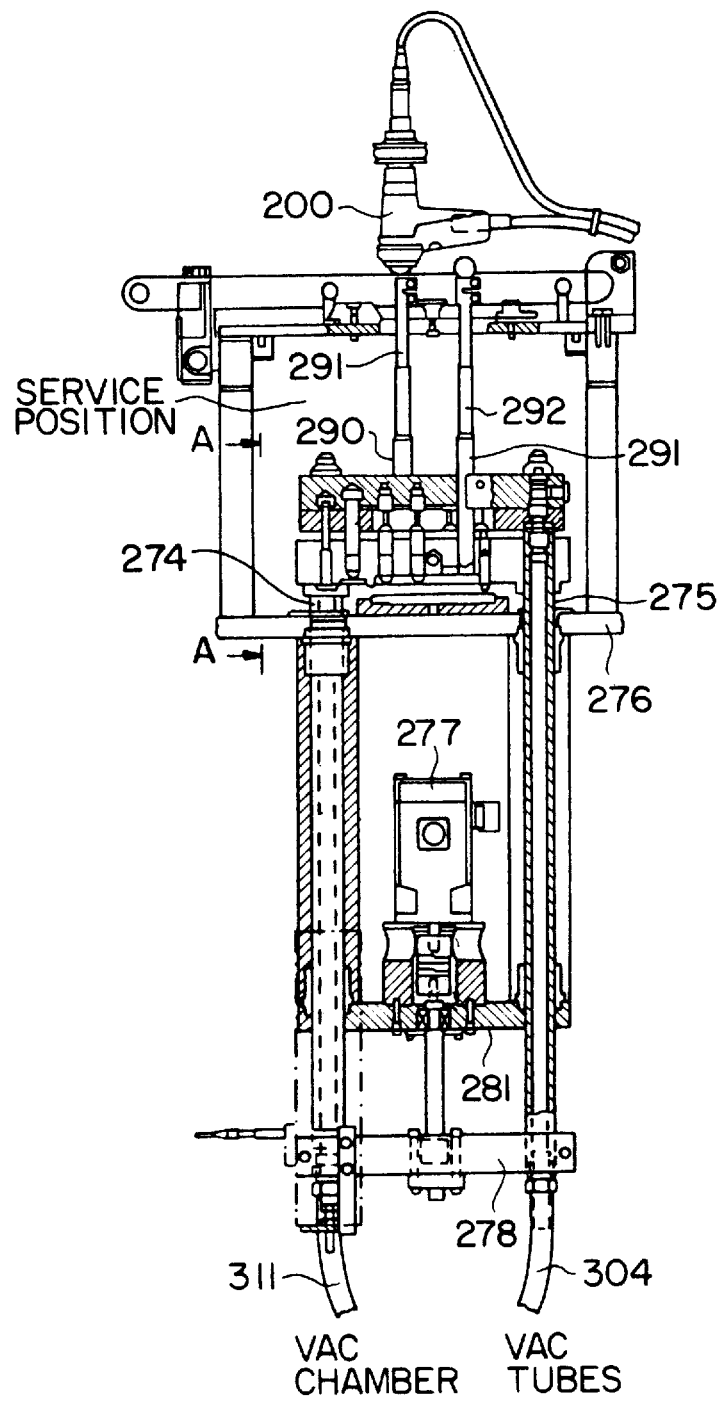

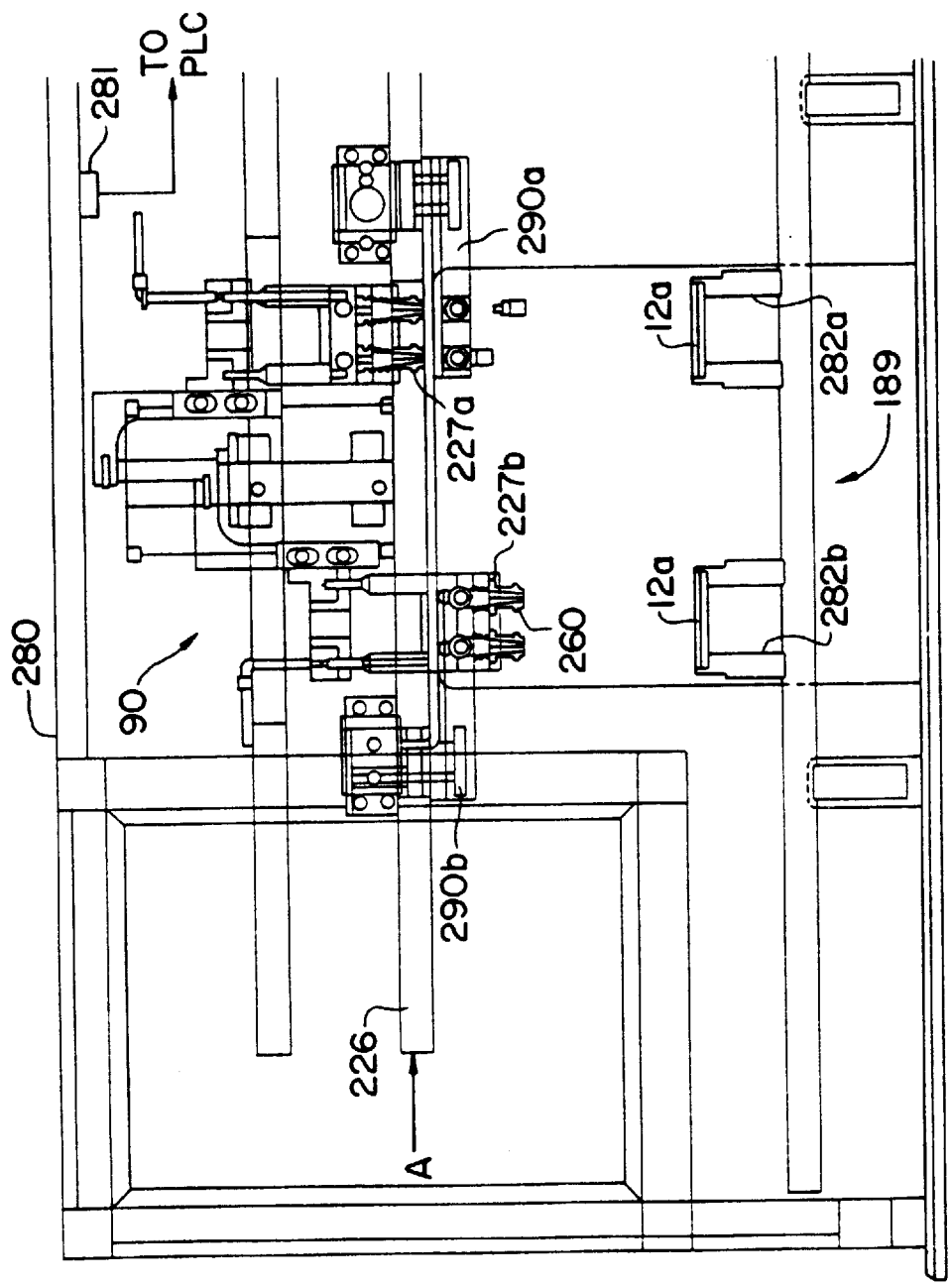

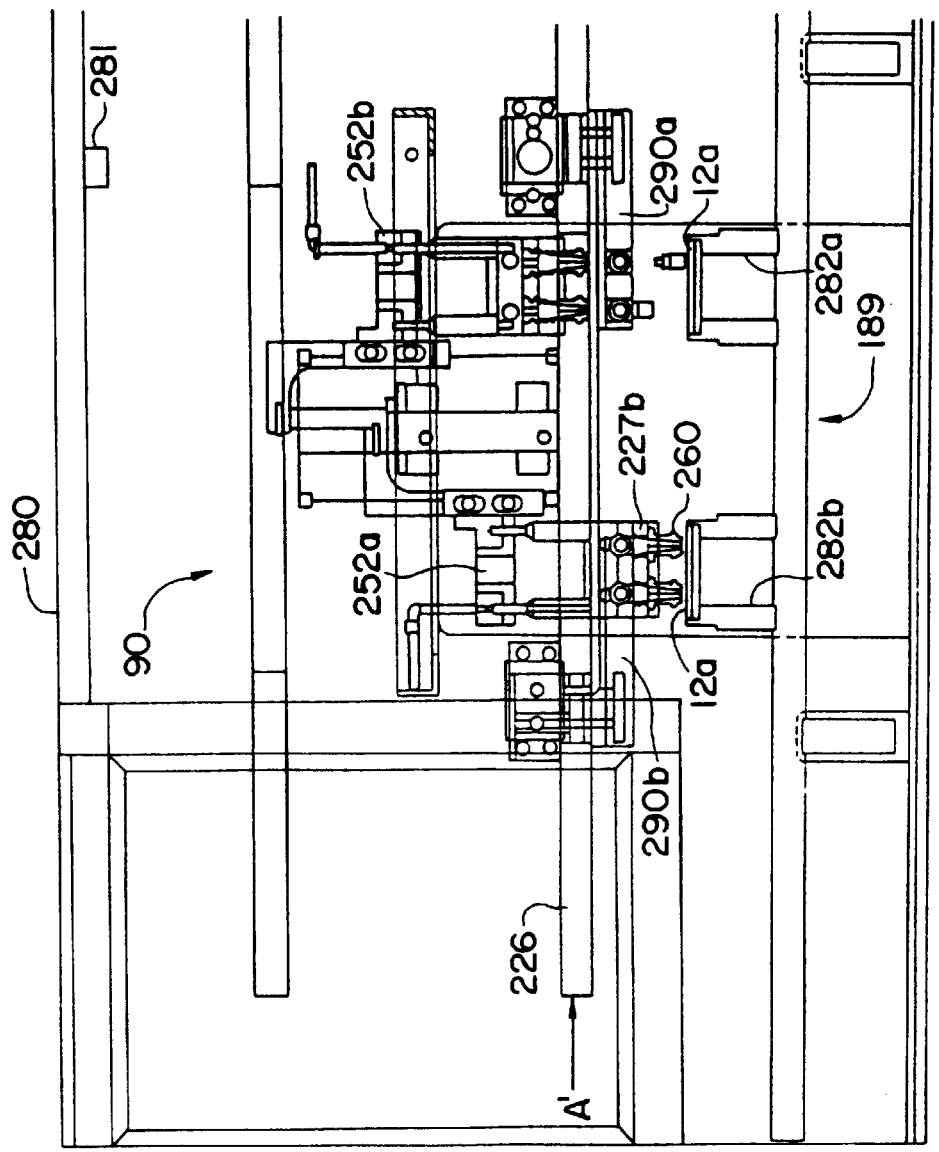

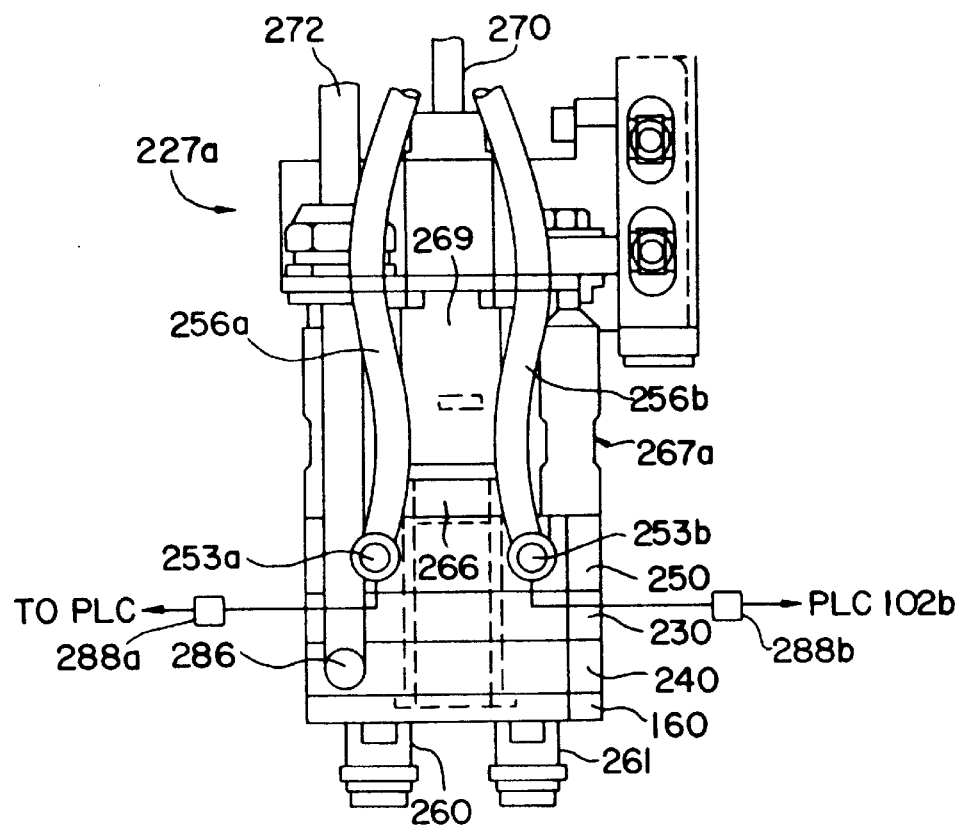
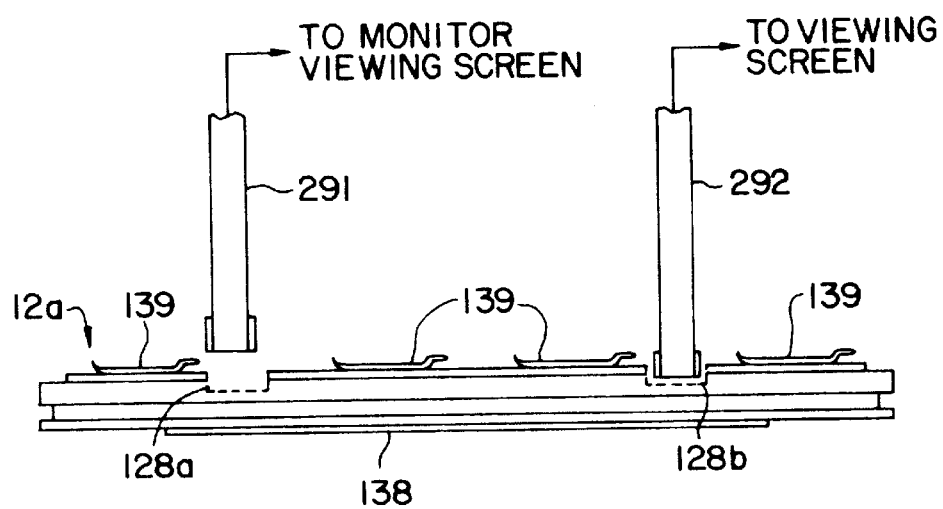

PRODUCTION LINE TRACKING AND QUALITY CONTROL SYSTEM

This application is a continuation of application Ser. No. 08/720,897 filed Oct. 7, 1996, abandoned which is a continuation of application Ser. No. 08/582,269 filed Jan. 3, 1996, abandoned which is a continuation of application Ser. No. 08/257,790 filed Jun. 10, 1994, now U.S. Pat. No. 5,555,504.

FIELD OF THE INVENTION

This invention relates generally to a contact lens manufacturing facility for producing ophthalmic contact lenses, and, in particular to a quality control bar code tracking system for identifying and tracking good and bad lenses that have been manufactured while being carried on pallets of a production line pallet carrier system throughout the various manufacturing stations of the facility.

DESCRIPTION OF THE PRIOR ART

The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application. Essentially, these references disclose an automated contact lens production process wherein each lens is formed by sandwiching a monomer between back curve (upper) and front curve (lower) mold halves. The monomer is polymerized, thus forming a lens, which is then removed from the mold sections and further treated and packaged for consumer use.

The monomer is sandwiched at a monomer filling and mold assembly station wherein the polymerizable monomer is first deposited on the front curve mold half and back curve mold half is subsequently placed on top of the front curve mold half to form a complete contact lens mold assembly. A mold assembly pallet or support system further transports the completed contact lens mold assemblies to other stations throughout the facility for further processing, until a completed polymerized contact lens is produced.

SUMMARY OF THE INVENTION

It is an object of the present invention to incorporate a tracking and quality control system in a production line pallet system that automatically tracks contact lens front curve and back curve mold halves and mold assemblies throughout a completely automated contact lens fabrication facility that manufactures ophthalmic contact lenses at a high production volume.

It is a further object of the present invention to incorporate a tracking and quality control system in a production line pallet system that automatically tracks contact lens mold halves and mold assemblies throughout process stations, including, but not limited to: contact lens filling, pre-curing, polymerizing, de-molding, and hydration stations of a contact lens fabrication facility.

Another object of the present invention is to provide a production line tracking and quality control system in a production line pallet system that includes a series of carrier pallets and conveyor system that transports front curve contact lens mold halves, back curve contact lens mold halves, and, contact lens mold assemblies in a contact lens fabrication facility, wherein each carrier pallet includes a unique identifying bar code enabling traceability of product from one assembly/processing station to another for enhanced quality control.

It is a further object of the present invention to incorporate in a production line tracking and quality control system a control means in the form of a computer or programmable logic controller that includes bar code reading devices at various locations throughout the contact lens fabrication facility for identifying and tracking pallets carrying good or flawed contact lenses ("products") in the production line pallet system.

It is yet still a further object of the present invention to incorporate in a production line tracking and quality control system a control means that includes memory storage devices for receiving data and information representing process condition status of each carrier pallet throughout the contact lens production facility.

Still another object of the present invention to incorporate in a production line tracking and quality control system a means for associating operations performed on a carrier pallet, or important events occurring to the pallet, and the time an event occurred with a specific identified pallet ID.

It is yet another object of the present invention to incorporate in a production line tracking and quality control system a control means for determining whether the production status of the front curve mold halves, back curve mold halves, and, contact lens mold assemblies carried on each carrier pallet have been processed under conditions that are within prescribed process parameter tolerances, or, out of the prescribed limits with regard to a specific process parameter.

Yet still another object of the present invention is to provide a production line tracking and quality control system having a control means that initiates specific carrier pallet rejection when it is determined that the front curve mold halves, back curve mold halves, and/or contact lens mold assemblies carried on the specific pallet have been processed under conditions not within the prescribed tolerances.

The above objects are achieved in a production line tracking and quality control system that comprises a series of pallets for carrying either one or more first contact lens mold halves or complementary second contact lens mold halves throughout a contact lens fabrication facility. Each pallet includes a unique identifying code for identification and tracking purposes and are transported on a conveyor means throughout the contact lens fabrication facility that includes one or more process stations. A control means provides real time monitoring of the contact lens fabrication processes at the one or more process stations, and includes tracking means for identifying the unique code of each pallet at various locations in the facility. The control means receives process parameter values at each station for each of the carrier pallets transported therethrough and issues a reject signal when the process parameters are out of bounds.

Further benefits and advantages of the invention will become apparent from a consideration of the following detailed description given with reference to the accompanying drawings, which specify and show preferred embodiments of the invention.

BRIEF DESCRIPTION OF THE DRAWINGS

The foregoing objects and advantages of the present invention for a contact lens production line pallet system may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 2(b) is a detailed view of a contact lens mold assembly 139 comprising complementary first and second mold halves 131,133 situated in a recess of a production line pallet 12a.

FIGS. 4(a) and 4(b) illustrate the control loops for determining oxygen exposure times for front curve and back curves, respectively, after exiting respective injection mold assemblies.

FIG. 11(a) is a partially cross-sectioned side view of the mold assembly module 59 of the filling/mold assembly station 50.

FIG. 11(b) is a diagrammatic and partially cross-sectioned illustration of the assembly station 59 illustrating the vacuum supplies for the reciprocating assembly.

FIG. 19(a) illustrates a front elevational view of the de-molding apparatus 90.

FIG. 19(b) illustrates a front elevational view of the steam heat assembly applying steam heat to a pallet 12a carrying mold assemblies.

FIG. 20 illustrates is a detailed illustration of one of the steam heat discharge assemblies 227a.

FIG. 21 is a detailed view of the fiber optic probes 291, 292 of bore scopes being inserted within the pallet blinds 128a,128b for viewing the surface of the pallet.

DESCRIPTION OF THE PREFERRED EMBODIMENT

Figure 1:
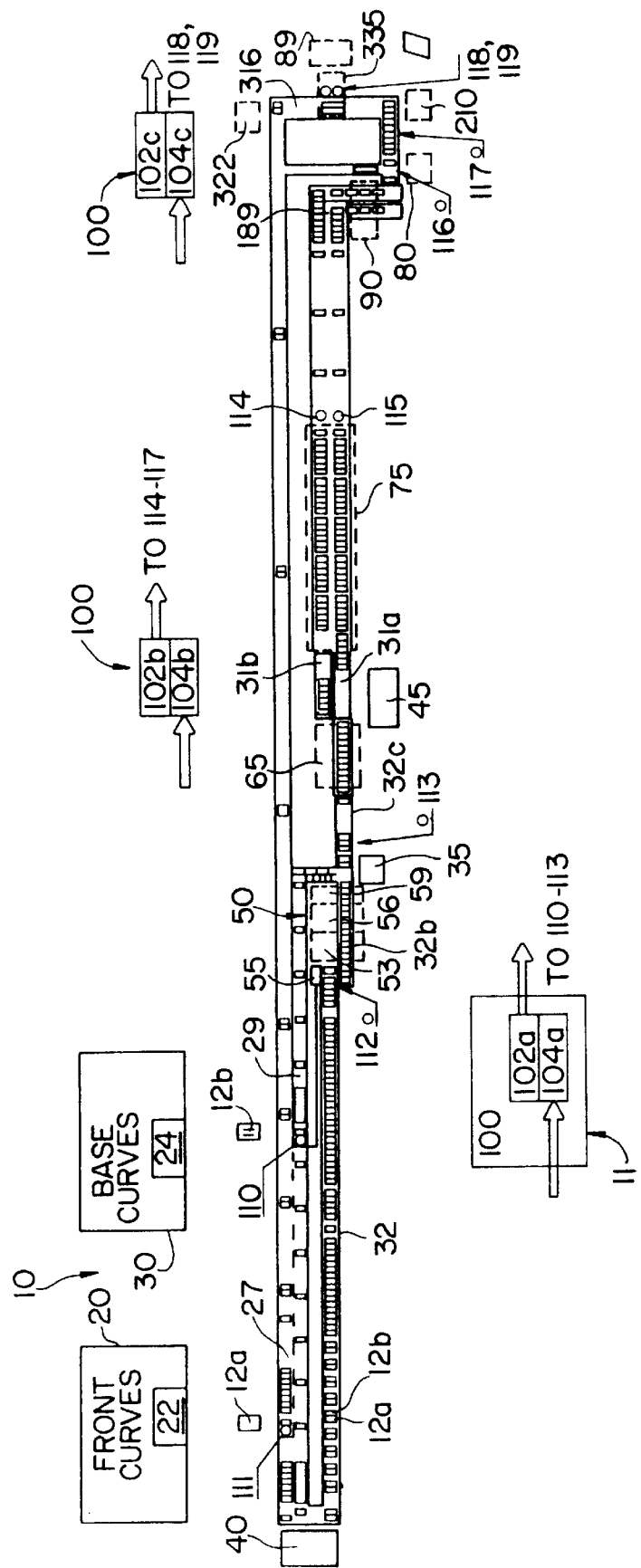
FIG. 1 is a diagrammatic top view of a contact lens production line pallet system incorporating the production line tracking and quality control system of the instant invention.

Referring to FIG. 1, there is shown a diagrammatic view of the production line pallet system 10 implemented in a contact lens fabrication facility having the quality control and production line tracking system 11 of the instant invention. The operational details of the pallet system 10 may be found in co-pending patent application U.S. Ser. No. 08/257, 786 entitled "Contact Lens Production Line Pallet System" (now U.S. Pat. No. 5,774,357) assigned to the same assignee as the instant invention and the disclosure of which is incorporated by reference herein. Generally, the contact lens fabrication facility incorporating the pallet carrier system 10 comprises various contiguously located stations including: injection mold assembly stations 20 and 30 for manufacturing thermoplastic front curve contact lens mold portions and back curve contact lens mold portions, respectively. The front curve injection mold assembly station 20 includes a robotic apparatus 22 for transporting up to eight front curve mold portions at a time from station 20 to a pallet 12a positioned adjacent a first pallet conveyor 27 and the back curve injection mold station 30 includes an apparatus 24 for transporting up to eight back curve mold portions at a time within a pallet 12b positioned adjacent a second pallet conveyor 29, both first and second pallet conveyors 27,29 partially enclosed in a low-oxygen enclosure. A sequencing apparatus 40 for situating a pallet 12a containing front curve contact lens mold portions adjacent a pallet 12b containing a corresponding number of complementary back curve contact lens mold portions onto a sequenced pallet conveyor 32 is also provided to enable pallets 12a,12b to be conveyed alternately and sequentially into the filling and mold assembly stations 50. The filling/mold assembly station 50 generally includes: a first apparatus 53 for depositing, in a vacuum environment, a polymerizable compound (monomer mixture) for forming a contact lens in the concave portion of each front curve lens mold portion in each pallet 12a; a second apparatus 56 for depositing a surfactant along an annular rim portion of the front curve for facilitating the later removal of the back curve mold portion and the associated excess monomer ring "HEMA ring" from the front curve mold portion in a mold separation apparatus located downstream of the filling apparatus 50; and, a third apparatus 59 for assembling the individual contact lens mold assemblies which consists of picking each back curve lens mold from pallet 12b and placing them onto a corresponding associated front curve lens mold located on carrier pallet 12a in an oriented configuration. The simultaneous placing of each back curve lens mold from pallet 12b on an associated front curve lens mold on conveyor pallet 12a takes place in a vacuum environment. Additionally, as shown in FIG. 1, after the back curves are removed from the second pallet 12b, a pallet recirculating ram assembly 35 pushes the empty back curve pallets 12b back to the original back curve supply conveyor 29 for receipt of a new set of back curve lens mold portions from injection mold assembly 30.

As illustrated in FIG. 1, the pallets 12a containing completed mold assemblies exit the filling/mold assembly stations 50 and are conveyed along conveyor 32c to a pre-cure chamber 65 where the monomer solution contained in each mold assembly is partially cured into a viscous gel-like state and where the front and back curve lens molds are subject to a predetermined pressure to further define the contact lens edges and to eliminate decentration.

After exiting the precure chamber 65, the pallets containing the precured lenses are transported along conveyor 32c to a polymerization station 75 where the precured lenses contained in the individual mold assemblies are fully polymerized in UV ovens to form the contact lens blank. As shown in FIG. 1, the sequenced pallet conveyor 32c is split into two conveyors, 31a and 31b, to enable a longer residence time in the polymerization chamber as the mold assemblies are polymerized. Pusher apparatus 45 is used to direct the travel of a predetermined amount of pallets containing the mold assemblies from conveyor 32c to each of the two conveyors 31a,b.

After the polymerizable compound in each of the mold assemblies are polymerized to form a contact lens blank at the polymerization station 75, the pallets travel through a demold buffer area 76 providing temperature adjustment to the mold assemblies exiting the ovens, and along a dual walking beam 189 to a back end of the pallet system 10 that includes a mold separation apparatus 90 where the back curve lens mold halves of the mold assemblies are automatically separated from the front curve lens mold halves to expose the polymerized contact lens for conveyance to the downstream hydration station 89. After the demold process, pusher assembly 210 pushes a series of pallets 12a on to a reciprocating transfer pallet apparatus 335 which conveys the pallets to a hydration assembly 89. At the hydration assembly, the front curve lens mold portions containing polymerized contact lens therein are simultaneously removed from their respective pallets and placed in an appropriate hydration chamber (not shown) so that each contact lens may be hydrated prior to packaging. The transfer apparatus subsequently returns the empty pallets back to conveyor 31f where a pusher assembly 322 transfers the empty first pallets back to conveyor 27 where they are transported to receive a new batch of front curve lens mold portions from injection mold assembly 20.

Figure 2A:
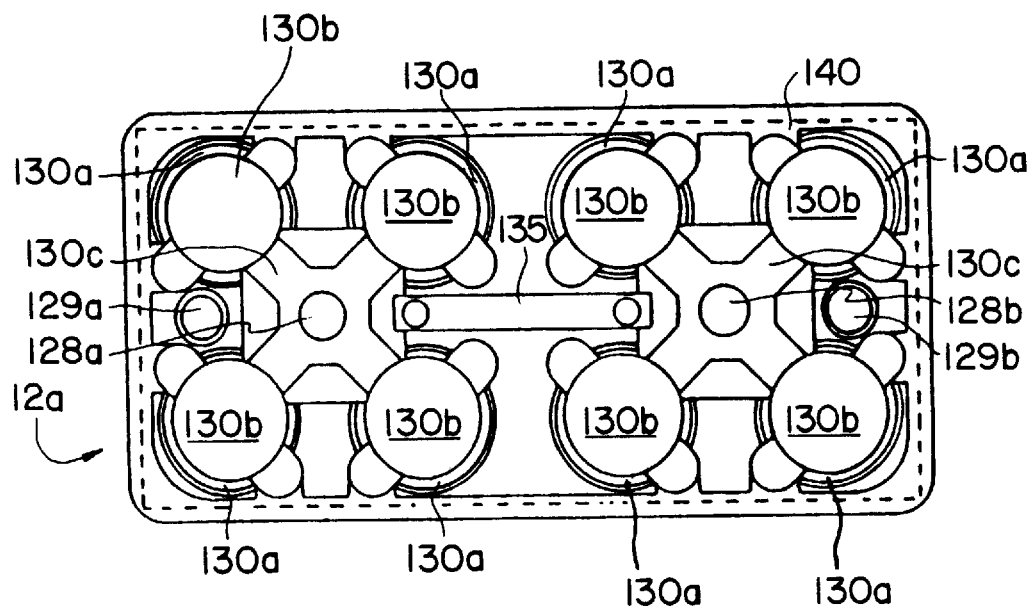
FIG. 2(a) is a top plan view of a production line pallet 12a (12b) of the present invention.

A top view of a production line pallet 12a for carrying production lens mold halves is shown illustrated in FIG. 2(a). It should be understood that pallets 12a,b are interchangeable in that they may accommodate either front curve or back curve contact lens mold halves. The production line pallets 12a,b may be formed of aluminum and may be up to 60 mm in width and 120 mm in length. In another embodiment, the pallet 12a may be formed of stainless steel and may be 90 mm in width and 160 mm in length. As shown in FIG. 2(a), each pallet 12a,b also contains a plurality of recesses 130b for receiving a respective contact lens mold assembly 139 comprising a complimentary pair of front and back curve mold halves which define the shape of the final desired lens. One such mold assembly 139 is shown seated within a recess 130b of the pallet in FIG. 2(b). The contact lenses are formed by placing an amount of polymerizable composition, generally on the order of about 70 milligrams, in each front curve (concave) mold half 131 seated within a pallet recess 130b at the filling/mold assembly apparatus 50. The desired amount depends on the dimensions (i.e., the diameter and thickness) of the desired lens, taking into account the generation of by-products upon polymerization and exchange water for those by-products and diluent, if any, following polymerization. Then, the back curve (convex) mold half 133 is placed onto the polymerizable composition 132 with the first and second mold halves aligned so that their axes of rotation are collinear and the respective flanges 131a, 133a are parallel. The mold halves 131 are carried in an annular recess 130a which receives and supports the annular flange 131a of the front curve mold half. In addition to the recesses 130b, the pallets 12a,b also have a plurality of oriented recesses 130c which receive the triangular tab portion 131c of the seated front curve mold half 131 to provide a predefined angular position thereof. The recesses 130c are designed to prevent movement of the normally seated mold half within each recess up to within ±0.1 mm. The triangular tab 133c of the second or back curve mold half 133 overlies front curve tab 131c to ensure a collinear axis of rotation with respect to the two mold halves.

As shown in FIG. 2(a), at the surface of and proximate the center of each pallet 12a (,12b) is a unique bar code identifier 135 that is scanned by bar code scanners 110–119 (FIG. 1) mounted at various locations in the facility to provide handling, tracking, and quality control as will be explained in detail below. Additionally, the pallets 12a, (12b) include blind holes 128a and 128b wherein a fiber optic bore scope or similar viewing device may be inserted to enable real time viewing of the contact lens production process at the surface of the pallet, as will be explained in further detail below.

As shown in FIG. 1, the production line tracking and quality control system 11 includes a control device 100 which may be a computer or one or more programmable logic controllers (PLC). As explained in further detail below, the control means 100 includes a plurality of sensor devices for real-time monitoring of contact lens process conditions. The sensor devices generate process condition information at particular stations of the facility for receipt by the computer or PLC which controls the processes performed to the pallet carrying mold halves or mold assemblies at the particular station. The respective PLC then processes the information and generates appropriate control signals for corrective action, and/or generates error flags indicating other types of intervention or correction may be needed.

In the preferred embodiment shown in FIG. 1, control means 100 constitutes at least two (2) PLC's, and associated circuitry and software, for providing tracking and control of the production line pallet system 10 throughout the contact lens manufacturing facility. A first PLC 102a of control device 100 controls and tracks pallet transport from the injection mold stations 20,30 up to and including the filling/mold assembly stations. A second PLC 102b of control device 100 provides quality control of and tracks pallet transport through the precure, UV polymerization, and mold separation stations. A third PLC 102c of control device 100 is provided for retaining the identification of pallets at the hydration assembly where the contact lens are removed from the pallets for subsequent processing. Additional PLCs (not shown) are provided for controlling the various aspects of hydration, post hydration, lens inspection, and packaging stations, as described in co-pending applications U.S. Ser. No. 08/258,556 entitled "Automated Method and Apparatus for Hydrating Soft Contact Lenses", now U.S. Pat. No. 5,476,111, assigned to the same assignee as the instant invention the disclosure of which is incorporated by reference herein, and U.S. Ser. No. 08/257,791 entitled "Automated Apparatus and Method for Packaging Products", now U.S. Pat. No. 5,528,878, assigned to the same assignee as the instant invention and the disclosure of which is incorporated by reference herein. Preferably, each PLC is a TI system 545 (Texas Instruments) and may include a TI 386/ATM coprocessor module for communicating with the PLC across the backplane or by serial link (not shown). In the preferred embodiment, the PLC 102b has the 386/ATM module which is connected to a starnode network comprising bar code scanner decoder units, as will be explained in further detail below.

As shown in FIG. 1, memory storage devices 104a,b, and c are provided for each PLC 102a,b, and c, respectively, and have adequate addressing and storage capabilities for each respective PLC to access and process data in the form of time information and process condition status information. Specifically, the process condition status information constitutes information indicating whether or not particular contact lens "products" are good or bad, i.e., whether process conditions involving a particular pallet carrying contact lens mold halves or contact lens mold assemblies up to a particular point in time, have been performed in accordance with prescribed limits and tolerances. This information is used to determine whether the products carried by that specific pallet are either good or flawed. The specific pallet will be rejected by appropriate means provided in the pallet system 10, if a product or products carried by that pallet are determined to be bad or out of process specification parameters. The time information for each pallet constitutes the specific time that the process condition status has been last updated for each pallet, i.e., the time at which a pallet has passed a particular bar code scanner. The time period in which each pallet undergoes a specific process or event, for e.g., enters and leaves a specific processing station, is calculated by the PLC using the time information entries in the memory storage devices in the manner described in greater detail below. The control means 100, as implemented by the various PLCs, includes a master clock (not shown) having a 10 second resolution, i.e, is incremented every 10 seconds, for determining the pallet time (time stamp) information. The master clock will be reset to −32000 on every lot changeover (explained below) or after a program download and the maximum value for the clock is +32767 before the master clock will be reset. This gives the system a total of 179 hours before the master clock will be reinitialized. To manage the pallet clock and to secure possible changes of times, the software defines these values: PALL_SEC_TIC, representing the value in seconds on the pallet master clock; and, PALL_CLOCK, representing the pallet clock time value since the master clock was last reset.

As shown in FIG. 1, the production line tracking and control system 11 is provided with bar code scanner devices, indicated as elements 110–119 in FIG. 1, and mounted at strategic locations throughout the fabrication facility. Each bar code scanner device 110–119 is preferably a bar code laser scanner manufactured by Scanstar, Model No. 110, manufactured by Scanstar Inc. located at Atlanta, Ga., and is provided for identifying each specific pallet or pallets carrying contact lens mold halves or mold assemblies. Specifically, each bar code scanner at the locations shown in FIG. 1 identifies each pallet passing under it by scanning the pallet's unique identifying bar code. Each bar code scanner is provided with decoding units such as Scanstar, Model No. 240 (not shown) so that data corresponding to the identified pallet, which in the preferred embodiment, is an integer number, may be input to the PLC for updating process status information and/or time stamp information at memory locations associated with the identified pallet, as will be described in detail below. The decoders for each bar code scanner are networked linked, preferably, in a starnode configuration.

Figure 3:
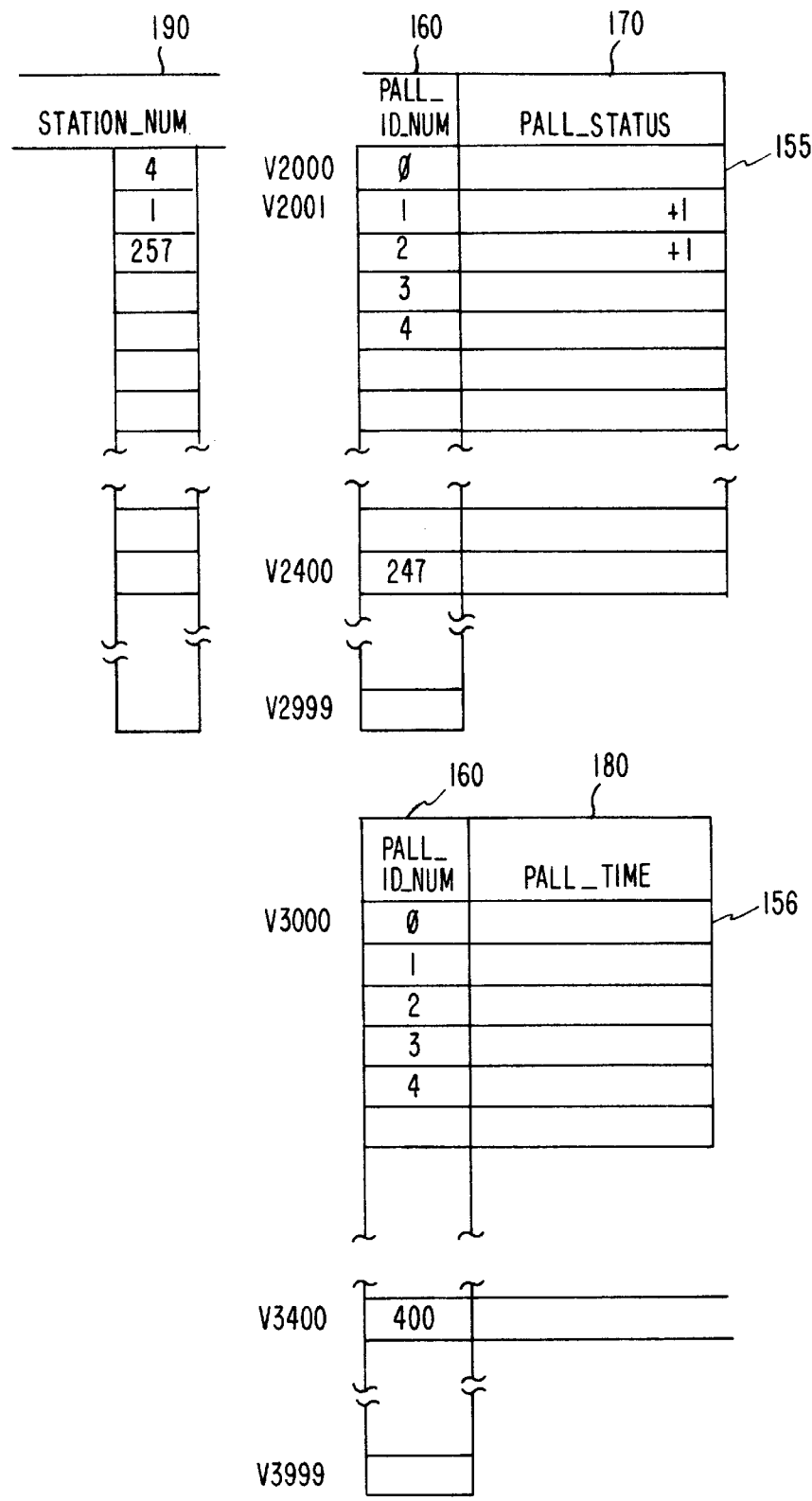
FIG. 3 illustrates the memory organization for the control system including array 170 for storing process condition information and array 180 for storing time stamp information for each pallet of the production line tracking system of the instant invention.

The preferred embodiment of the memory organization for each PLC memory storage devices (104a,b,c) is shown in FIG. 3. Particularly, each pallet has at least three memory locations assigned to it a memory location containing process condition status information data associated with each pallet and hereinafter designated as PALL_STATUS, one memory location containing time information data (time stamp) associated with each pallet and hereinafter designated as PALL_TIME, and, the third memory location for storing the pallet identification number, or the pointer 160 for the array, hereinafter designated as PALL_ID_NUM. Preferably, the memory is organized as an array or look-up table with a block of contiguous memory locations 170 containing PALL_STATUS information and a block of contiguous memory locations 180 containing PALL_TIME information. As shown in FIG. 3, a particular memory location 155, 156 of each respective block 170, 180 may be accessed on an array-type basis, where the pallet identification number, PALL_ID_NUM, is the pointer 160. Preferably, a third array block 190 of contiguous memory locations 190 is provided which contains STATION_NUM information which holds the ID number of the pallet (PALLET_ID) that is in particular station. There only needs to be as many elements in STATION_NUM array as there are stations that re controlled by the PLC. The PALL-STATUS block 170 and PALL-TIME block 180 need to have as many elements as there are pallets in the portion of the line controlled by the particular PLC. As shown in FIG. 3, many are numbered 1 through 400 which is greater than the maximum number of pallets present in the system 10 during steady state operation.

Each location 155 of the process condition status memory block 170 comprises a 16 bit-addressable register for storing PALL_STATUS information pertaining to the status of each identified pallet at any point in time throughout the system. Likewise, each location 156 of the time stamp memory block 180 comprises a 16 bit-addressable register for storing PALL_TIME information pertaining to the time each identified pallet passes a particular bar code scanner. PALL_STATUS information preferably consists of a positive (+) integer number indicating that the status of the products carried by the identified pallet is good, or, a negative (−) integer number indicating that the status of the products carried by the identified pallet is flawed. It is understood, however, that any scheme for associating good versus flawed products may be used. This association of bad versus good products in the PALL_STATUS memory locations 155 allows the PLC to determine whether a particular station of the lens fabrication facility should perform an operation on the identified pallet. If the status for an identified pallet is negative, no more operations are performed and the negative status remains until a reject station is reached. It should be mentioned that only the first cause for rejection (a negative status) is stored and that any failure result subsequently received for the same pallet, prior to the pallet's removal from the system, will be ignored.

The status and time stamp 182 information may be entered into software driven shift registers which are 16-bit registers for holding pallet status information for pallets contained at a particular station. The shift registers are primarily used to keep track of those pallets in buffer areas like the degassing and curing stations. As will be explained in detail, each shift register holds the pallet number and status information for particular pallets. Data within these registers may be shifted to a succeeding register as the pallet itself is advanced throughout a portion of the system as will be explained in detail below.

As explained in further detail in co-pending patent application U.S. Ser. No. 08/257,800 entitled "Computer Program for Quality Control", now U.S. Pat. No. 5,461,570 assigned to the same assignee as the instant invention, a data acquisition system (not shown) collects the reject codes (negative PALL_STATUS values), as well as the individual process parameter values gathered by and alarm signals generated by each PLC for particular process operations, and inputs this information into a cell supervisor that associates the process parameters and conditions at the various process stations with identified pallets, so that a chart can be generated highlighting most frequent problem areas of the lens fabrication system. This data acquisition and supervisory program can correlate the product/process information to contact lens quality information for quality improvement and process optimization.

The following is a description of bar code tracking function of the production line tracking and quality control system of the present invention:

When a determination is made by the control system 100 and particularly PLC 102a,b,or c that a particular pallet has been subject to a process while out of tolerance with respect to one or more process condition parameters, for e.g., $O_2$ exposure times, light intensity, temperature, etc., then the control system 100 may determine that the particular pallet subjected to that out of tolerance condition should not be subject to any further operations at the next process station of the facility. Additionally, it will determine that the particular pallet should be rejected.

The first process condition that is checked in the production tracking and quality control system is the ambient air (oxygen) exposure time of the front curve or back curve mold halves after injection mold assemblies 20,30 output respective front curve mold halves and back curve mold halves to the time the pallets 12a,12b receive them from the robot assemblies 22,24, respectively, and they are input to the nitrogen buffer.

Figure 5:
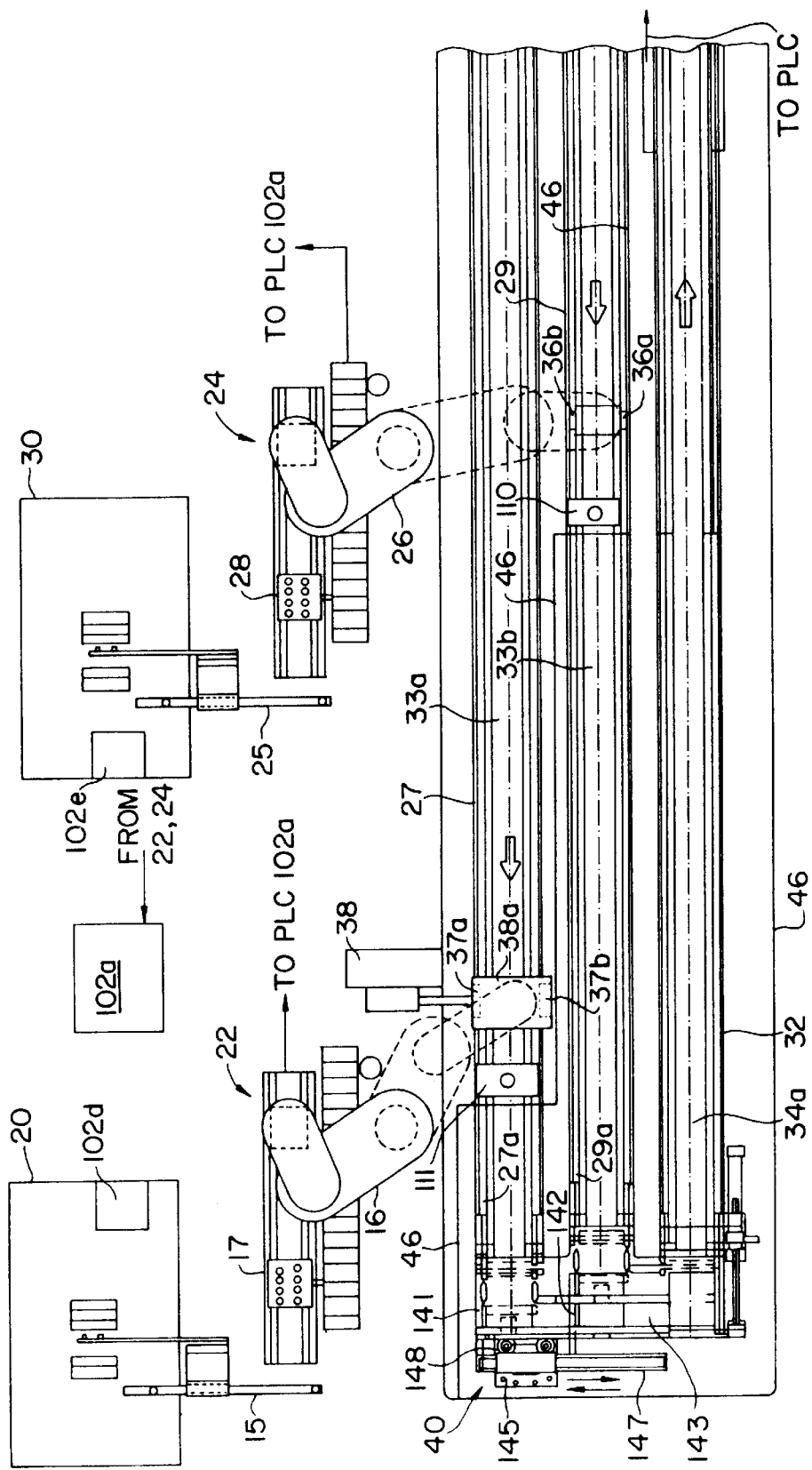
FIG. 5 illustrates in detail robotic devices 22 and 24 for transporting respective front curve and back curve mold portions from their respective injection mold assemblies 20,30 to their respective pallets, and also illustrates the sequencing apparatus 40 for positioning a pallet 12a containing front curves adjacent a pallet 12b containing back curves for interleaved conveyance on sequencing conveyor 32.

FIG. 5 illustrates in detail robotic apparatuses 22 and 24 for transporting respective front curve and back curve mold portions from respective contact lens injection mold assemblies 20 and 30 to respective pallets 12a and 12b of the pallet system. A detailed description of each injection mold assembly 20 and 30 may be found in the aforementioned co-pending patent application U.S. Ser. No. 08/257,802 "Low Oxygen Molding of Soft Contact Lenses", now U.S. Pat. No. 5,753,150 assigned to the same assignee as the instant invention, the disclosure of which is incorporated by reference herein. A detailed description of each robotic apparatus 22 and 24 may be found in co-pending patent application U.S. Ser. No. 08/258,267 entitled "Apparatus for Removing and Transporting Articles from Molds", now U.S. Pat. No. 5,681,138 assigned to the same assignee as the instant invention, the disclosure of which is incorporated by reference herein. As further shown in FIG. 5, contact lens injection mold assemblies 20 and 30 are controlled by their own PLC 102d, 102e, respectively, each of which is internal to and governs processes occurring in the respective assembly, and, each of which initiates the pallet tracking and quality control processes to be explained in greater detail below.

Generally, robotic apparatus 22 is provided with a first robotic assembly 15 for removing batches of front curve lens mold articles from injection mold assembly 20, and transporting the articles to a first location; assembly 17 is provided for receiving the front curve lens mold articles from assembly 15 at the first location and transporting the articles from the first location to a second location, and robotic assembly 16 is provided for receiving the front curve lens mold articles from assembly 17 and transporting those articles from the second location to an inverting head 38a of inverting device 38 that inverts the orientation of the front curve mold portions carried by the robot 16. This inversion is necessary because the robotic assembly 16 is handling the front curve mold portions at their non-optical (convex) side and the front curve mold portions must therefore be inverted to enable the non-optical surface of each mold to be placed in the pallet 12a that has been momentarily paused by clamping means 37a,b to receive the front curve lens mold articles from assembly 22. As shown in FIG. 5, a clamping mechanism 37 comprising a pair of clamping jaws 37a,b (shown as phantom lines) are located at opposite sides of the conveyor 27 to timely clamp an empty pallet 12a and halt its motion so that the front curve mold halves may be positioned on the pallet by inverting head 38a. It should be mentioned that the process of transferring front curve lens mold halves from the injection mold assembly to the pallets 12a on conveyor 27 occurs in an ambient air environment.

As explained in detail in the above-mentioned co-pending patent application U.S. Ser. No. 08/257,802 entitled "Low Oxygen Molding of Soft Contact Lenses", now U.S. Pat. No. 5,753,150, the front lens curve mold portions must be transferred to a low oxygen environment during contact lens processing to avoid lens mold degradation by over-exposure to oxygen. Therefore, immediately after each successive transference of the front curve mold halves from the robot to each of the pallets 12a, the pallets are unclamped by clamp mechanism 37a,b and conveyed to the nitrogen gas enclosure 46, as shown in FIG. 5.

To initiate the production line pallet tracking and quality control as shown in FIG. 4(a), the PLC 102d will initiate a first timer (Timer_A) before a first batch of front curve lens mold portions are output from the injection mold assembly 20 and transferred to the robot assembly 22, as indicated at step 341 in FIG. 4(a). It will also initiate and arm a second timer before a second batch of front curve lens mold portions are output from the injection mold assembly 20 and transferred to the robot assembly 22 as indicated at step 341' in FIG. 4(b). Two timers (hence two control loops) are used because at any one time, only two sets of front curves mold portions (or back curves) may exist and be exposed to air between an injection mold assembly and the nitrogen buffer enclosure. Specifically, PLC 102d starts the first stop-watch timer (at step 345) to begin timing the oxygen exposure of a first set of front curve mold halves as they are output from the injection mold assembly 20 at step 343. This first timer data is stored in a separate PLC time register (not shown) that is pointed to by a flip-flop pointer register which is a two-bit memory location. The transfer of mold halves proceeds and the pallet 12a is loaded with the first batch of front curve lens molds at step 348. After the pallet is loaded, the timer stops and he value of the first stop-watch timer is evaluated at step 349 to determine the maximum oxygen exposure time, indicated as O2_AIR_MAX, thus far. In the preferred embodiment, this maximum air exposure time must be twelve seconds or less. Meanwhile, in the time the first set of front curves are being transferred to a pallet 12a, a second set of front curves are output from the injection mold assembly 20. PLC 102d thus starts a second stop-watch timer (at step 345') to begin timing the oxygen exposure of the second set of front curve mold halves as they are output from the injection mold assembly 20 at step 343'. This time stamp is stored in a second timer register located in a separate PLC time register (not shown). After the time comparison is made for the first set of curves (after they are loaded on to the first pallet), then the flip-flop pointer (not shown) will point to the second timer to keep track of time for the second set of curves at step 349. This will also initiate the first timer to reset itself and be initialized so that the exposure time for a subsequent set of mold halves output from injection mold assembly 20 can be evaluated. If the exposure time of 12 seconds, as measured by the first timer, has been exceeded, then an error flag will be generated and temporarily stored until that pallet is identified.

After the second set of curves are loaded to a second pallet conveyor that is registered to receive the second set of front curves at step 348', the second stop watch timer stops and the value of the second stop-watch timer is evaluated at step 349' to determine the maximum oxygen exposure time for the second set of curves. Again, this maximum air exposure time must be twelve seconds or less. The second timer is then reset and initialized so that the exposure time for a subsequent set of mold halves can be evaluated. If the exposure time of 12 seconds has been exceeded, then an error flag will be generated and temporarily stored until the pallet is identified.

Immediately after transfer of the first set of front curves to a pallet 12a, a third timer (not shown), resident in the PLC 102a, is activated to record the time that the pallets were loaded thereon. Then, the clamping mechanism 37a,b is released to enable conveyance of the pallets to the nitrogen enclosure 46. Bar code scanning device 111, shown in FIG. 5, then scans the bar code 135 of the pallet to identify the pallet, and addresses the memory location corresponding to its PALL_ID_NUM to record the time of entry of the identified pallet into the nitrogen tunnel 46. The PLC writes the time stamp value into the PALL_TIME array 180 for each identified pallet 12a entering the nitrogen tunnel 46 as follows:

PALL_TIME[PALL_ID_NUM]:=PALL_CLOCK;

PLC 102a will then make a determination as to whether the time difference between the time recorded by the third timer and the first time stamp of bar code scanner 111 is less than or equal to three (3) seconds, and, if it has been previously determined that the exposure time for the pallet was greater than twelve seconds as stored in the error flag register (resident in PLC 102d not shown). If the PLC determines that the exposure times are within the above-described limits, then the operational status of that first pallet (e.g., pallet number 1) is good, and the PLC enters process condition data into a location in PALL_STATUS array 170 as follows:

PALL_OK_CODE :=+1

PALL_STATUS[PALL_ID_NUM ]:=PALL_OK_CODE;

where PALL_OK_CODE is the 16 bit word indicating that the pallet status is good. As shown in FIG. 3, the PALL_STATUS data at memory location PALL_STATUS[1] is a positive 1 value indicating that the front curve lens mold air exposure time was less than 15 seconds. Similarly, if the PLC determines that the exposure times are not within the above-described limits, then the operational status of that first pallet (e.g., pallet number 1) is deemed flawed and the PLC enters a value into a location in PALLET_STATUS memory array 170 as follows:

PALL_STATUS[PALL_ID_NUM]:=−1;

A value of −1 into process condition status data into PALL_STATUS memory array 170 corresponding to a specific pallet indicates that the front curve lens mold air exposure time was greater than 15 seconds, and that the pallet should be rejected. This process is repeated for each of the series of pallets 12a receiving front curve lens mold halves that are entering the system. Note that the exact same process is implemented for tracking back curve lens molds output from the injection mold assembly 30 as will be explained in detail below.

As described above with respect to front curve lens mold portions, apparatus 30 shown in FIG. 5 is provided with a first robotic assembly 25 for removing batches of back curve lens mold articles therefrom and transporting the articles to a first location; assembly 28 is provided for receiving the back curve lens mold articles from robotic assembly 25 at the first location and transporting the articles from the first location to a second location, and robot assembly 26 is provided for receiving the back curve lens mold articles from assembly 28 at the second location and transporting those articles from the second location to a predetermined location along a back curve supply conveyor 29 carrying a back curve lens pallet 12b that has been momentarily paused to receive the back curve lens mold articles from assembly 24. The process of transferring back curve lens mold halves from the injection mold assembly to the pallets 12a on conveyor 27 occurs in an ambient environment.

Each of the pallets 12b for receiving the back curve lens mold portions are momentarily paused on carrier conveying belts 29 at the time of transfer of the front curve mold assembly. As shown in FIG. 5, a clamping mechanism 36 comprising a pair of clamping jaws 36a,b are located to timely clamp an empty pallet 12b to halt its motion on conveyor 29 while the back curve mold halves are positioned on the pallet by robot assembly 26. The operation of the clamping mechanisms 36 and 37 is described in detail in above-mentioned co-pending patent application U.S. Ser. No. 08/257,786 entitled "Contact Lens Production Line Pallet System" now U.S. Pat. No. 5,774,357. To avoid lens mold degradation as described above, immediately after transference of the mold halves from the robot to the pallets, each pallet 12b carrying the back curve lens mold portions is unclamped by clamp mechanism 36a,b and conveyed to the nitrogen gas enclosure 46, as shown in FIG. 5.

As described above with respect to FIGS. 4(a) and 4(b), to initiate the production line pallet tracking and quality control, the PLC 102*e* will initiate a first timer at the time a first batch of back curve lens mold portions are output from the injection mold assembly 30 and transferred to the robot assembly 24, and, will initiate a second timer at the time a second batch of back curve lens mold portions are output from the injection mold assembly 30 and transferred to the robot assembly 24. Two timers are used because at any one time, only two sets of back curves mold portions may exist and be exposed to air between an injection mold assembly and the nitrogen buffer enclosure. Specifically, PLC 102*e* initiates the first stop-watch timer (not shown) to begin timing the oxygen exposure of a first set of back curve mold halves as they are output from the injection mold assembly 30. This first timer data is stored in a separate PLC time register (not shown) that is pointed to by a flip-flop pointer which is a two bit boolean register in the preferred embodiment. The transfer of mold halves proceeds and the pallet 12*b* is loaded with the first batch of back curve lens molds. After the pallet is loaded, the timer stops and the value of the first stop-watch timer is evaluated to determine the maximum oxygen exposure time thus far. In the preferred embodiment, this maximum air exposure time must be twelve seconds or less. Meanwhile, in the time the first set of back curves are being transferred to a pallet 12*b*, a second set of back curves are output from the injection mold assembly 30. PLC 102*e* thus initiates a second stop-watch timer (not shown) to begin timing the oxygen exposure of the second set of back curve mold halves as they are output from the injection mold assembly 30. This time stamp is stored in a second timer register (not shown). After the time comparison is made for the first set of curves (after they are loaded on to the first pallet), then the flip-flop pointer (not shown) will point to the second timer to keep track of time for the second set of curves. This will initiate the first timer to reset itself and be initialized so that the exposure time for a subsequent set of mold halves output from injection mold assembly 30 can be evaluated. If the exposure time of 12 seconds, as measured by the first timer, has been exceeded, then an error flag will be generated and temporarily stored until that pallet is identified.

After the second set of curves are loaded to a second pallet that is registered to receive the second set of back curves, the second stop watch timer stops and the value of the second stop-watch timer is evaluated to determine the maximum oxygen exposure time for the second set of curves. Again, this maximum air exposure time must be twelve seconds or less. The second timer is then reset and initialized so that the exposure time for a subsequent set of mold halves can be evaluated. If the exposure time of 12 seconds has been exceeded, then an error flag will be generated and temporarily stored until the pallet is identified.

Immediately after transfer of the first set of back curves to a pallet 12*b*, a third timer resident in PLC 102*a* is actuated to record the time that the pallets were loaded thereon. Then, the clamping mechanism 36*a,b* is released to enable conveyance of the pallets to the nitrogen enclosure 46. Bar code scanning device 110, shown in FIG. 5, then scans the bar code 135 of the pallet to identify the pallet, and addresses the memory location corresponding to its PALL_ID_NUM to record the time of entry of the identified pallet into the nitrogen tunnel 46. The PLC writes the time stamp value into the PALL_TIME array 180 for each identified pallet 12*b* entering the nitrogen tunnel 46 as follows:

PALL_TIME [PALL_ID_NUM]:=PALL_CLOCK;

PLC 102*a* will then make a determination as to whether the time difference between the time recorded by the third timer and the first time stamp of bar code scanner 110 is less than or equal to three (3) seconds, and, if it has been previously determined that the exposure time for the pallet was greater than twelve seconds as stored in the error flag register (not shown). If the PLC determines that the exposure times are within the above-described limits, then the operational status of that pallet (e.g., pallet number 2) is good, and the PLC enters process condition data into a location in PALL_STATUS array 170 as follows:

PALL_OK_CODE :=+21

PALL_STATUS[PALL_ID_NUM]:=PALL_OK_CODE;

where PALL_OK_CODE is the 16 bit word indicating that the pallet status is good. As shown in FIG. 3, the PALL_STATUS data at memory location PALL_STATUS[1] is a positive 21 value indicating that the back curve lens mold air exposure time was less than 15 seconds. Similarly, if the PLC determines that the exposure times are not within the above-described limits, then the operational status of that pallet is deemed flawed and the PLC enters a value into a location in PALLET_STATUS memory array 170 as follows:

PALL_STATUS[PALL_ID_NUM]:=−21;

A value of −21 into process condition status data into PALL_STATUS memory array 170 corresponding to a specific pallet indicates that the back curve lens mold air exposure time was greater than 12 seconds, and that the pallet should be rejected. This process is repeated for each of the series of pallets 12*b* receiving front curve lens mold halves that are entering the system. Note that this entire process is repeated for each set of back curve lens molds output from the injection mold assembly 30.

The next set of process conditions that are monitored in the production tracking and quality control system of the present invention occur in the degassing (nitrogen buffer) station comprising the nitrogen enclosure 46. The degassing process accomplishes, to as treat extent as possible, the purging of oxygen from the previously exposed back and front curve lens molds portions. Preferably, oxygen exposure times of approximately 12–15 seconds requires at least three (3) minutes of time in the nitrogen tunnel 46. This purge time is geometric and an oxygen exposure time of 30 seconds or greater may require up to 30 minutes of time in the nitrogen tunnel. $N_2$ degassing time is verified at the entry into the monomer filling and mold assembly station 50, where bar code scanner 112 identifies each pallet 12*a*,12*b* entering the station, and informs the PLC to generate a corresponding time stamp value corresponding to the time of entry of each identified pallet 12*a*,12*b* into the monomer filling station. The PLC writes the time stamp value into PALL_TIME[PALL_ID_NUM] locations of memory storage array 180 corresponding to each identified pallet entering the monomer filling/mold assembly station 50 and then makes a determination as to whether the difference in time between the previous first time stamp value (indicating entry into the nitrogen tunnel) and the most recent time stamp value (indicating entry into the monomer filling station) is three (3) minutes or greater. The PLC performs the time difference calculation between barcode scans for each pallet as follows:

PALL_TIME:=PALL_TIME[PALL_ID_NUM];

PALL_TIME_DIF:=(PALL_CLOCK_PALL_TIME) * PALL_SEC_TIC;

If the PLC determines that the transport time of each pallet in the nitrogen-rich enclosure 46, i.e., PALL_TIME—DIF, is greater than three (3) minutes, then the operational status of that pallet is good, the pallet is released to enter the filling/assembly module 50, and the PLC enters process condition data into a location in PALLET_STATUS array 170 as follows:

PALL_OK_CODE :=+2

PALL_STATUS[PALL_ID NUM]:=PALL_OK_CODE;

where PALL_OK_CODE :=+2 indicates that the pallet 12a carrying front curve mold portions are good. If the PLC determines that the pallet transport times within the nitrogen enclosure are not within the above-described limit, then the pallets will be retained within the nitrogen enclosure until the three (3) minute time is reached. This is accomplished by the upstream clamping jaws 153a,b shown in FIGS. 8 and 9 that retain the pallets in the nitrogen buffer until the three minutes purge time is attained.

While in the nitrogen enclosure 46, it is possible that a failure of one (or more) process conditions may occur, for e.g., an $O_2$ gas concentration level that exceed tolerable limits. Failures such as high $O_2$ gas concentration in the buffer will affect the whole stream of pallets within the nitrogen buffer and all these pallets must be identified and marked as flawed in the memory array 170.

Figure 6:
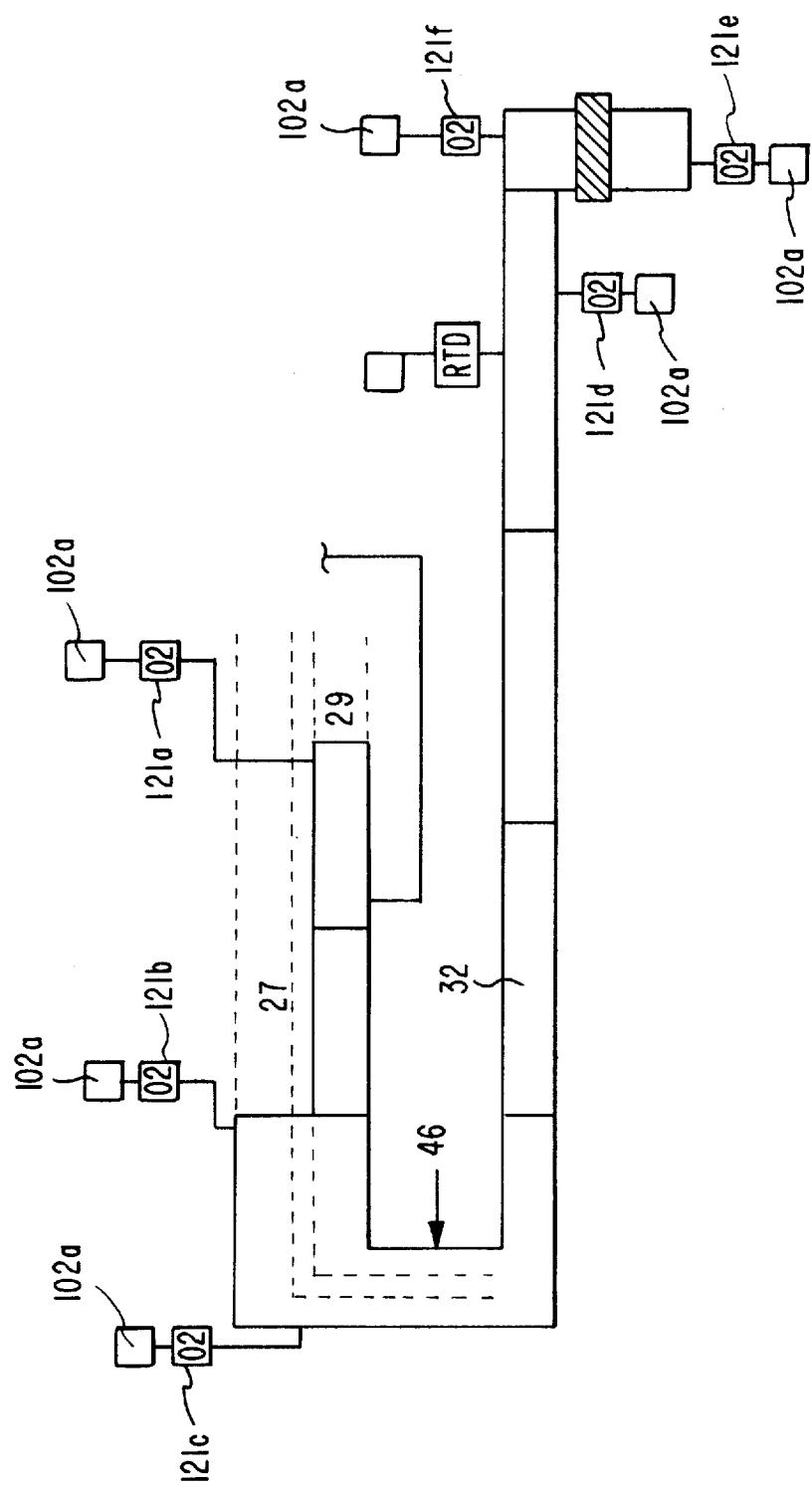
FIG. 6 illustrates in detail the placement of oxygen sensors for monitoring the concentration of oxygen in the nitrogen enclosure 46.

As shown in FIG. 6, oxygen sensors 121a–121f interfaced with the PLC 102a are mounted at various locations inside the enclosure 46 for continuously monitoring oxygen levels in the enclosure and signalling the PLC 102a when the oxygen concentration in the tunnel enclosure falls outside of the acceptable range of approximately 0.3% to 0.5% per cent. If the $O_2$ level in the enclosure is within these limits, then the PLC will update the process condition status PALL_STATUS[PALL_ID_NUM] for each pallet identified by bar code scanner 112 as they enter the filling station 50 indicating that the pallets are good.

If, at any time, the oxygen concentration is above a 0.5% limit, then the operational status of each pallet within the buffer at that time, should indicate an out-of-tolerance condition. Additionally, this event may trigger an alarm or warning signal indicating that intervention may be required. The PLC 102a will proceed to scan memory array 170 for values of +1 and +21, which indicate the specific pallets that have successfully entered the nitrogen buffer and are in the buffer at the time of the out of tolerance condition, and change each status to a flawed (—'ive integer) status. Specifically, the PLC will update the process condition status PALL_STATUS[PALL_ID_NUM] memory by entering, for e.g., a -1 value for each PALL_ID_NUM having a +1 status (front curves), and, a -21 value for each PALL_ID_NUM having a +21 status (back curves), into process condition status array 170 indicating that those pallets are no longer good and should be rejected.

As explained in greater detail in above-mentioned co-pending patent application U.S. Ser. No. 08/257,786 entitled "Contact Lens Production Line Pallet System", now U.S. Pat. No. 5,744,357 a sequencing apparatus 40 is provided (FIG. 1) for situating a pallet 12a containing front curve contact lens mold portions adjacent a pallet 12b containing a corresponding number of complementary back curve contact lens mold portions onto a sequenced pallet conveyor 32, which is wholly contained in the $N_2$ enclosure 46. The purpose is to sequentially convey the pallets in an alternating manner with the pallet 12b containing back curve lens mold halves first, followed immediately thereafter by a pallet 12a carrying front curve mold halves, into the filling and mold assembly stations 50 for the contact lens mold assembly process.

Figure 7:
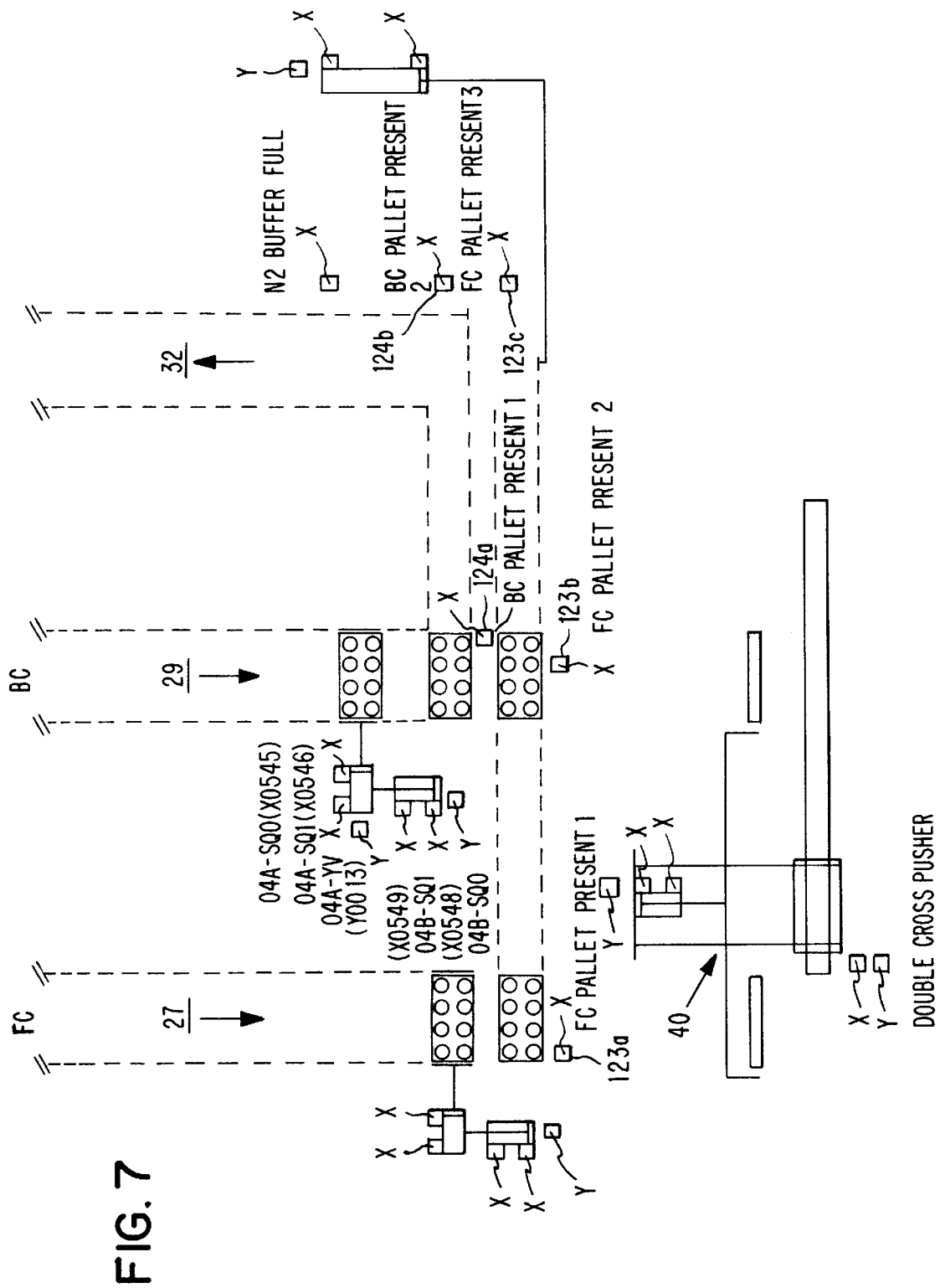
FIG. 7 illustrates in detail the placement of proximity sensors for verifying the correct sequencing of pallets within the nitrogen buffer enclosure.

As shown in FIGS. 5 and 7, a double cross pusher 40 is located at the respective ends 27a,29a of each supply conveyor 27, 29 and comprises a first arm 141 and second arm 142 for simultaneously pushing pallets from respective supply conveyors 27 and 29 along track 143 for entry into the main sequencing conveyor 32. As illustrated in FIG. 5, the first arm 141 and second arm 142 are mounted in parallel on mounting means 145 that is slidable along track 147 in the directions indicated by the double arrows from an original position, as shown in FIG. 5, to an extended position (not shown). A lifting means 148, which may be pneumatically operated, is provided for raising the mounting means and first and second arms 141,142 in a vertical direction above the plane of a horizontally positioned pallets, to reciprocate the arms back to their original positions on track 147 after pushing adjacently positioned pallets 12a,12b to conveyor 32 for transport in the nitrogen enclosure 46 to the monomer filling station.

As shown in FIG. 7, suitable proximity sensors 123a,b,c and 124a,b are located along track 143 to confirm that pallets 12a carrying front curve lens mold portions, and pallets 12b carrying back curve lens mold portions, respectively, are in proper positions and are being properly sequenced by double cross-pusher apparatus 40. While being positioned for sequencing and while being sequenced by the cross-pusher 40, the proximity sensors 123a–123c and 124a,b signal the PLC 102a to confirm proper positioning of the pallets for their alternating conveyance to the monomer filling/assembly station 50. Proximity sensors 123a–123c and 124a,b are redundant in nature and when an out of sequence is identified by any of these sensors, it is immediately communicated to an operator who can be made aware that the $N_2$ buffer could become full of improperly sequenced FC/BC pallets.

If a pallet is found to be out of sequence, then the PLC will update the process condition status PALL_STATUS [PALL_ID_NUM] memory 170 for the pallet identified by bar code scanner 112 to indicate that the pallets are good. The PLC will determine which identified pallet is out of sequence when the status pertaining to previously recorded front and back curve pallets at bar code scanners 111 and 110, are scanned by bar code scanner 112.

As explained in co-pending patent application U.S. Ser. No. 08/257,786 entitled "Contact Lens Production Line Pallet System" now U.S. Pat. No. 5,744,357, the paired sets of pallets 12a,12b carrying respective front curve and back curve lens molds reach a second sequencing apparatus 55 where their forward motion is staged for input to the filling apparatus 50.

Figure 8:
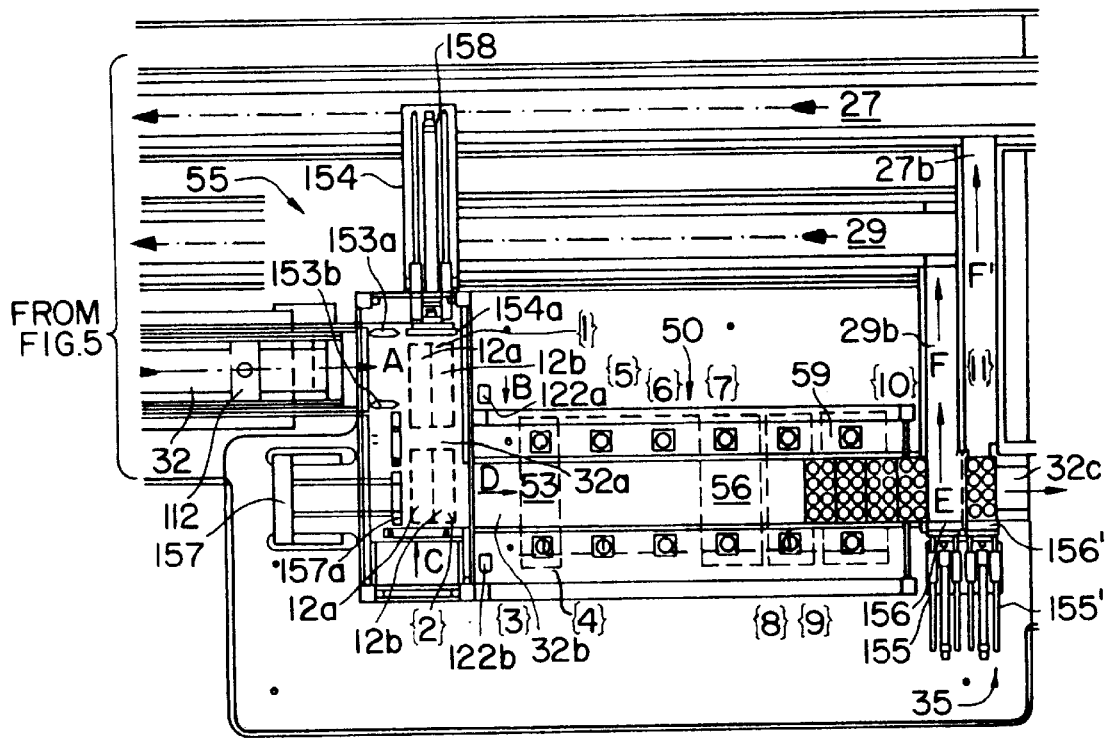
FIG. 8 illustrates the apparatus 55 for transferring pallets from conveyor 32 to the filling/mold assembly apparatus 50.
Figure 9:
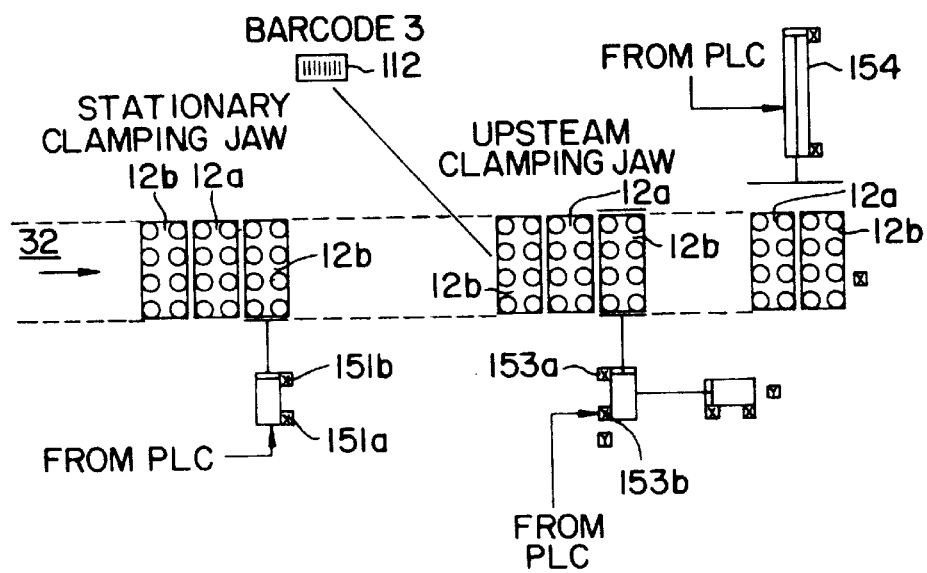
FIG. 9 is a diagrammatic illustration of the apparatus 55 for sequencing and tracking of pallets prior to entry in the monomer filling station 53.

FIGS. 8 and 9 illustrate the precision pallet handling apparatus 55 for continuously transferring alternating pallets, two at a time, from conveyor 32 into monomer dosing apparatus 53 of filling/mold assembly station 50. Specifically, the forward motion of the alternating pallets 12b, 12a on conveyor 32 is first terminated by a pair of clamping jaws 151a,b as shown in FIG. 9. When the motion of the first pallet is halted, the alternating series of pallets 12a,b accumulate therebehind.

As controlled by the PLC 102a, the stationary clamping jaws 151a,b are then disengaged to enable tracking by bar code scanner 112. After the jaws 151a,b are disengaged, the pallets are precisely conveyed to a pair of upstream clamping jaws 153a and 153b where their forward motion is again terminated by clamping the lead pallet 12b, as shown in FIG.

9. This enables the bar code scanner 112 to identify each pallet so that a new time stamp value may be entered by the PLC into each PALL_TIME[PALL_ID_NUM] location in memory storage array 180 for each identified pallet, to enable the PLC to correctly determine if $N_2$ buffer time is greater than three (3) minutes, and, confirm BC/FC sequence, prior to their entry in the filling/assembly station. This way the PLC will confirm that each pallet 12a carrying front curve lens mold portions are ready for monomer dosing and that the pallets are ready for mold assembly.

After the status check is made for each pallet entering the filling apparatus, the clamping jaws 153a,b successively open and close under precise PLC control to enable two pallets, a first pallet 12b carrying back curve lens mold halves and a second pallet 12a carrying front curve lens mold halves to align at position {1} indicated as "A" in front of pusher 154a of ram 154. Then, ram 154 which is driven by pneumatic cylinder unit 158 under precise PLC control, is timely activated to push the pallets 12a,12b along slide plate 32a for a distance equivalent to the length of a pallet in the direction indicated by arrow "B", to a position {2} in alignment with ram head 157a of ram 157 and also indicated as position "C" in FIG. 8. The ram 157, which is servo motor driven by suitable means (not shown), is timely activated to push the pallets 12a,12b along track 32b in the direction indicated by arrow "D" for a distance approximately equal to the width of the pallet ±0.1 mm for processing at the monomer dosing station 53. Under PLC control, twelve (12) pallets are sequentially input into the filling station/mold assembly for processing therein. It is understood that the timing of these operations is precise so that if an error occurs to a pallet while in the filling assembly 50, the PLC will be able to track the pallet by shift register control, as will be explained in detail below.

Tracking of pallet status information throughout the filling/mold assembly 50 is accomplished by a series of shift registers. As shown in FIG. 8, there are eleven indexing positions, indicated as {1}, {2}, . . . , {11}, that the pallets are indexed to for processing, and a shift register is dedicated at each position for storing the status and pallet ID information of the pallet at each location. As each alternating pallet is indexed within the filling mold/assembly station 50 by pusher assemblies 154 and 157, the pallet status and pallet ID information contained in the corresponding shift register is shifted to the next register position. The variables STATUS_BASE[i] and ID_BASE[i], where i =1,2, . . . ,11, contain the status and pallet ID information, respectively, for pallets 12b carrying back curves. The variables STATUS_FRONT[j] and ID_FRONT[j], where j=1,2, . . . ,11, contain the status and pallet ID information, respectively, for pallets 12a carrying front curve mold portions.

In operation, when each alternating pallet exits the nitrogen buffer and enter the location labelled position {1} in FIG. 8, the pallet status and pallet ID information updated by bar code scanner 112 is entered into the first shift register. For instance, for a back curve carrying pallet, the status information will be entered into the STATUS_BASE[1] variable and the pallet ID number will be entered into ID_BASE[1]. As the next sequential front curve carrying pallet enters position {1}, the status information from bar code scanner 112 will be entered into the STATUS_FRONT[1] variable and the pallet ID number will be entered into ID_FRONT[1]. Prior to a front curve pallet entering position {1}, the pusher 154 necessarily indexes a back curve pallet 12b to position labelled {2}, and, the status and pallet ID information stored in the shift register for index position {1}, is assigned to the shift register location number {2}; i.e.,

STATUS_BASE[2]:=STATUS_BASE[1];

ID_BASE[2]:=ID_BASE[1];

Positions {1} and {2} physically demarcate the end of the nitrogen buffer and the entrance into the filling/mold assembly station 50. At position {2} shown in FIG. 8, eight photo-electric sensors (not shown) are provided to sense that all eight mold halves are present on a particular pallet. If it is sensed that a mold half is not present, then the information contained in STATUS_BASE[2] (or STATUS_FRONT[2] for a pallet carrying front curve mold halves) will be updated with a negative status number indicating that that particular back or front curve pallet is flawed. This status will be shifted to each successive register position and remain with the pallet as the flawed pallet is advanced through the filling/mold assembly station.

For the next advance, the first front curve carrying pallet is indexed to position {2} after the original back curve carrying pallet is indexed by pusher 157 to an idle position labelled {3} in FIG. 8. The pallet status information and pallet ID information for both pallets are transferred as follows:

ID_FRONT[2]:=ID_FRONT[1];

STATUS_FRONT[2]:=STATUS_FRONT[1];

ID_BASE[3]:=ID_BASE[2];

STATUS_BASE[3]:=STATUS_BASE[2];

After ram pusher 157 indexes the back curve carrying pallet to the position {3} in FIG. 8, a laser assembly 122a,b is provided to implement a decentration check to ensure that all eight mold halves are correctly seated within a cavity. If a mold half is incorrectly seated, then the information contained in STATUS_BASE[3] or STATUS_FRONT[3] will be updated with a negative status number, for e.g. –6, indicating that the particular base or front curve pallet is flawed. Otherwise, the process condition status will indicate that the pallets are good and the shift registers will be so updated. Hence, it is not necessary to update the process condition status in memory array 170 since the status and pallet IDs are maintained in the shift register locations and the status/ID/memory is tracked to the first reject station where a pallet pass/fail decision is made for each pallet based on the contents of the shift registers. It should be mentioned that if all the pallets exiting the nitrogen buffer were deemed flawed due to an out of tolerance condition, then all the shift registers will contain a flawed status condition and each pallet will not be subject to further processing at the filling/assembly station and will subsequently be removed from the line.

Monomer filling station

Figure 10:
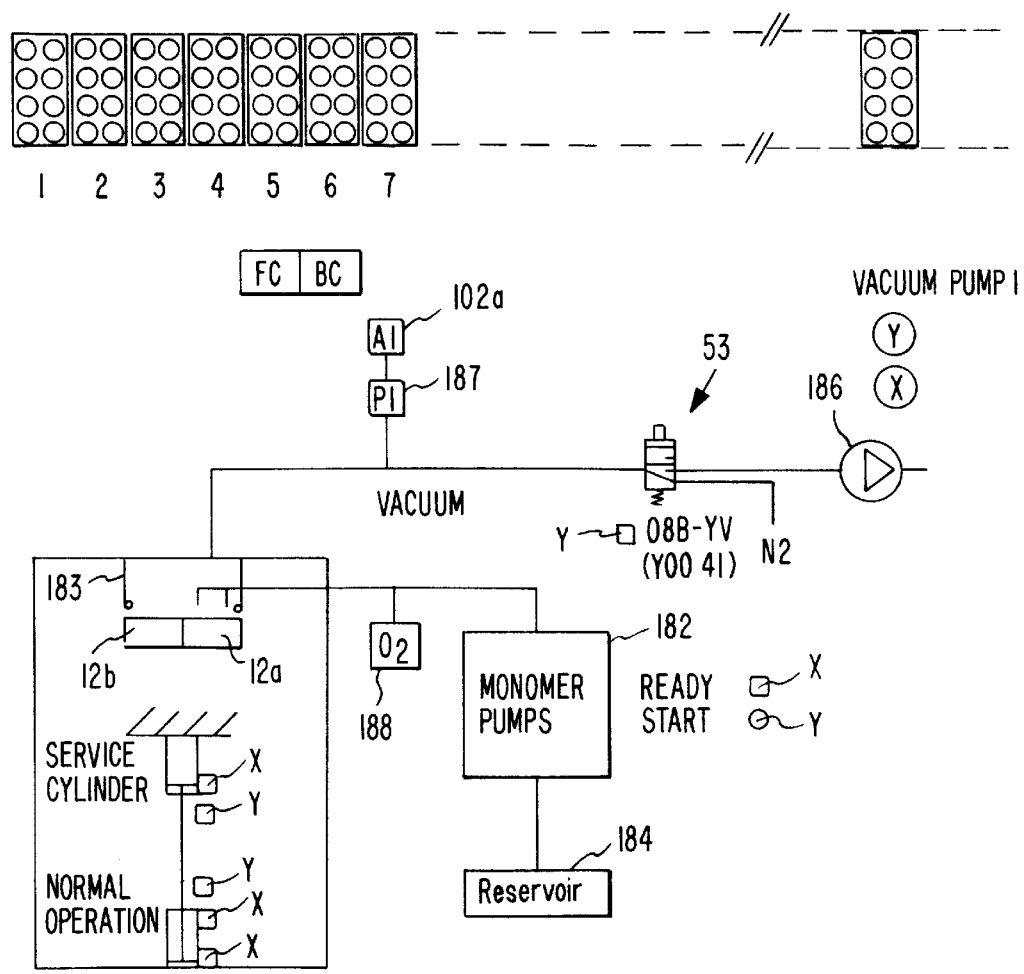
FIG. 10 is a schematic diagram of the monomer filling apparatus 53 of the filling/mold assembly station 50 of the fabrication facility.

As described briefly above and in further view of FIG. 10, a predetermined amount of the polymerizable hydrogel or monomer is deposited in each front curve mold half carried by pallet 12a by means of precision dosing nozzles 185, which are part of the dosing or filling apparatus 53 of station 50. The monomer may be dosed in each of the front curve mold halves, carried in the alternating pallets 12a, under vacuum to avoid the possibility of entrapping any gasses between the monomer and the front curve mold half. As described in further detail in co-pending patent application U.S. Ser. No. 08/258,264 entitled "Method and Apparatus for Contact Lens Mold Filling and Assembly", now U.S. Pat. No. 5,656,208, assigned to the same assignee as the instant invention and the disclosure of which is incorporated by reference herein, the polymerizable monomer mixture is first degassed to insure that dissolved gasses are not present in the monomer inasmuch as dissolved gasses may well form bubbles as the monomer is released from the relatively high pressure of the dosing nozzle to inert atmospheric, $N_2$ or vacuum conditions surrounding the front curve mold half. Additionally, the oxygen content of the monomer solution is monitored prior to discharge in the front curve mold cavities. Approximately 60 µl of polymerizable hydrogel or monomer is deposited in each front curve mold half to insure that the mold cavity is overdosed, and to avoid the possibility of incomplete molding.

Monomer dosing is accomplished in a vacuum that generated by a vacuum pump 186, shown in FIG. 10, created in a vacuum seal assembly 183 that forms an air-tight seal with the perimeter of each pallet. The excess monomer is removed from the mold cavity in the final step of the assembly of the front and back curve mold halves.

At the dosing apparatus 53, indicated at position {4} in FIG. 8, if a specific operation is out of tolerance or fails for some reason, the shift register information for the front (or back) curve pallet at that location will be updated. For instance, as shown in FIG. 10, if the monomer dosing pump 182 fails or discharges at an unacceptable rate, if the monomer containing reservoir 184 is empty or at a low level, if the monomer dosing time is not within the acceptable limit of 4 seconds, if the $O_2$ concentration level in the monomer as sensed by $O_2$ sensor 188 exceeds 5.0 ppm or is less than 3.5 ppm, or, if the vacuum in the dosing assembly created by vacuum pump 186 is not within acceptable limits as sensed by pressure sensor 187, then the PLC 102a will generate a negative status integer associated with the particular error for entry into the shift register STATUS_FRONT[4], indicating that a flawed pallet 12a exists that should later be rejected. Note, that the back curve carrying pallets 12b are conveyed to position {4}, but, are not processed there. Pallet ID and status information is still shifted into STATUS_BASE[4], however.

For the next index, the original back curve pallet is at position {5} and this position is an idle position. Pallet status and pallet ID data is shifted as follows:

ID_BASE[5]:=ID_BASE[4]

STATUS_BASE[5]:=STATUS_BASE[4]

Similarly, the front curve status data is shifted as follows when the front curve pallets are conveyed to position {5}:

ID_FRONT[5]:=ID_FRONT[4]

STATUS_FRONT[5]:=STATUS_FRONT[4]

Likewise, position {6} is an idle position so the front and back curve pallet status and pallet ID data is shifted as follows:

ID_BASE[6]:=ID_BASE[5]

STATUS_BASE[6]:=STATUS_BASE[5]

ID_FRONT[6]:=ID_FRONT[5]

STATUS_FRONT[6]:=STATUS_FRONT[5]

The next pallet index in the filling/assembly station 50 is to the tween stamp station 56, where surfactant is applied to FC, indicated at position {7} in FIG. 8. Pallet status and pallet ID data for front curve and back curve lens mold pallets are first updated as follows:

ID_BASE[7]:=ID_BASE[6]

STATUS_BASE[7]:=STATUS_BASE[6]

ID_FRONT[7]:=ID_FRONT[6]

STATUS_FRONT[7]:=STATUS_FRONT[6]

The next index in the filling/assembly station 56 is to the tab alignment area, indicated as position {8} in FIG. 8. Pallet status and pallet ID data is shifted as follows:

ID_BASE[8]:=ID_BASE[7]

STATUS_BASE[8]:=STATUS_BASE[7]

ID_FRONT[8]:=ID_FRONT[7]

STATUS_FRONT[8]:=STATUS_FRONT[7]

It should be mentioned that if an out of tolerance condition occurs at any of the above-described process locations, it will occur after the pallet ID and pallet status data has already shifted. The pallet status information for an out of tolerance condition is immediately entered into the shift register STATUS_FRONT, or, STATUS_BASE at that index corresponding to the location where the out of tolerance condition existed.

Mold Assembly Station

Figure 2B:
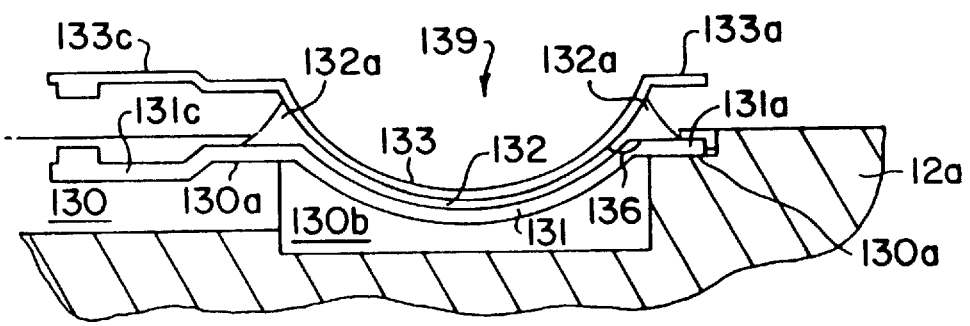

As previously mentioned, the complimentary pair of front 131 and back 133 curve mold halves which define the shape of the final desired lens are used to direct mold the monomer mixture (FIG. 2(b)). After the dosing step in the filling apparatus 50, in which the front concave mold half 131 is substantially filled with a polymerization mixture 132, the concave front mold half 131 is covered with the back curve mold half 133 under a vacuum to ensure that no air bubbles are trapped between the mold halves. The back curve mold half is then brought to rest on a circumferential edge of the concave front mold half to ensure that the resultant lenses are properly aligned and without distortion. The provision of tabs 131c, 133c extending from respective sides of each front and back curve mold halves are preferably positioned one over the other as shown in FIG. 2(b) during the mold assembly, to facilitate handling thereof, and to facilitate the prying apart of the halves after the polymerization.

The operation of the assembly station 59 is described in detail in above-mentioned co-pending patent application U.S. Ser. No. 08/258,264 entitled "Method and Apparatus for Contact Lens Mold Filling and Assembly", now U.S. Pat. No. 5,656,208. Briefly, in view of FIGS. 11 and 12, a series of reciprocable pistons 271 are mounted for reciprocation within a vacuum housing 272 and are both carried by and may float within the primary housing 273. Each of the three members 271, 272 and 273 reciprocate at various times, both with respect to each other and with respect to either pallet 12a,b registered therebeneath.

In operation, a pallet 12b containing back curve mold halves is advanced on conveyor 32b under the reciprocating pistons 271. When the pallet is in position, the assembly module 59 is reciprocated downwardly by servo motor 277 and cross-member 278 and the reciprocating tubes 274,275 to draw both the vacuum manifold housing and the primary housing downwardly. The vacuum manifold housing 272 is biased in its downward position by means of springs (not shown) and the individual reciprocating pistons 271 are biased downwardly to engage the back curve mold halves 131 on pallet 12b as a vacuum is drawn through vacuum manifold (not shown) in each reciprocating piston 271.

As the assembly module reaches its lower most point of travel, each of the back curves is removed from the back curve mold pallet 12b by the vacuum drawn in the reciprocating pistons 271. The entire assembly module 59 is then reciprocated upwards in approximately 0.25 seconds to enable transport of the empty pallet 12b along conveyor 32b out of the assembly module and to permit the registration of a new pallet 12a that is filled with front curve mold halves, each one of which has been dosed with a monomer at the filling module 53. Pallet 12a is advanced into position in precise registration with the pistons by means of two tapered registration pins, one of which pin 306 is shown in the Figure, which cooperate with the blind registration holes 129a,129b formed on pallet 12a,b as illustrated in FIG. 2(a). The taper on pin 306 is sufficient to register the pallet within ±0.1 mm for the purposes of precision assembly of the mold halves.

The assembly cycle begins by reciprocating both the vacuum manifold housing 272 and the primary housing 273 downwardly until a perimeter seal 310 contacts the outer perimeter 140 of the pallet 12b. As contact is made with the perimeter seal, a vacuum switch is actuated by means of a proximity switch adjacent to reciprocating cross-head 278 which actuates a second vacuum source which is drawn through vacuum tube 311 and the interior of reciprocating drive tube 274 to evacuate the chamber formed between the vacuum manifold housing 272 and the platform 276.

It should be noted that the vacuum drawn in the two reciprocating drive tubes 274,275 is slightly different, with the vacuum drawn in the tube 275 being slightly greater than that drawn in tube 274 in order to insure that the back curves are retained on the reciprocating pistons 271 prior to their deposition on the monomer and the front curve mold half. In the preferred embodiment, the pressure drawn in the vacuum manifold around the pallet 12b is on the range of 5 to 7 millibars while the vacuum drawn within the reciprocating pistons 271 is on the order of 3 to 5 millibars.

After the vacuum has been established in the vacuum manifold housing 272, the vacuum manifold housing ceases to reciprocate and remains stationary with respect to the pallet 12b. However, the upper or primary housing 273 continues to reciprocate downwardly enabling the back curves to contact the monomer and slowly displace it outwardly to fill the mold cavity as the two mold halves are assembled. The vacuum maintained around the housing enables the assembly of the two curves in a more rapid and expeditious manner than if assembled under ambient $N_2$ pressure. When assembled under vacuum, the deposition speed may reach as high as 5 mm per second, whereas without vacuum, any speed greater than 1 mm per second may result in undue agitation of the monomer and the creation of bubbles which effect and impair the quality of the resultant lens. Furthermore, assembly and sealing under vacuum enables the mold assembly to be clamped together by atmospheric pressure after it emerges from the vacuum chamber.

A pair of bore scope housings 283 and 284 provide access for a bore scope 291 and a fiber optic probe 292 which may be inserted into the assembly cavity for viewing and quality control purposes. When not in use, the bore hole housings 283,284 are closed by a blind in order to allow a vacuum to be drawn within the assembly housing. Further, if a vacuum is not drawn, it is possible for nitrogen to be trapped between the mold halves or between the monomer and the back curve thereby creating another bubble or puddle which will result in rejection of that lens.

A clamping pressure of approximately 0.3 kgF is necessary to firmly seat the back curve mold half on the front curve mold half and to seat the convex portion of the curve against the knife ring 136 (FIG. 2(b)) formed on the front curve mold half and to thereby sever the monomer in the lens blank 132 from the monomer in the HEMA ring 132a. After the mold halves have been seated, the vacuum in each of the reciprocating pistons 271 is first broken by opening a valve in vacuum line in 304. Shortly thereafter, and after a predetermined clamping period and a predetermined clamping pressure, the vacuum between the vacuum manifold housing and the pallet 12a is broken by opening a valve in vacuum line 311. Typically the period is 0.5 to 3 seconds, but preferably is 1.5 seconds. The clamping pressure may range from 0.5 to 2 Kgm/lens but preferably is 1 Kgm/lens. Thereafter, drive motor 277 is actuated and the entire assembly module 59 is raised upwardly by servomotor 277 and reset for a new back curve pickup and a new cycle of operation.

Figure 12:
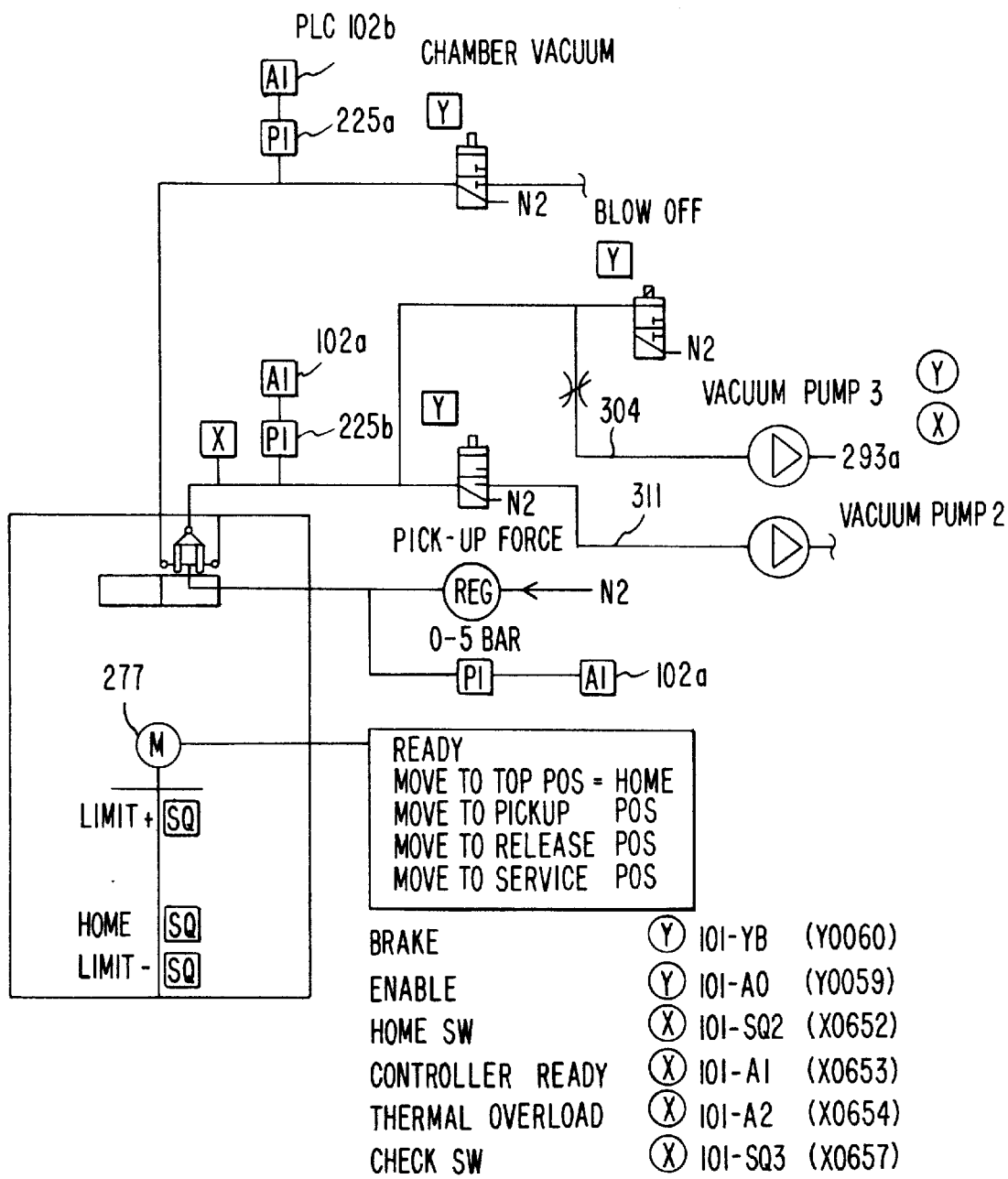
FIG. 12 is a schematic diagram of the assembly station 59 illustrating the placement of various sensors interfaced with the PLC.

At the assembly apparatus 59, indicated as position {9} in FIG. 8, if a specific operation is out of tolerance or fails for some reason, the shift register information for the front (or back) curve pallet at that location will be updated. For instance, as shown in FIG. 12 which illustrates schematically the placement of PLC sensors in the mold assembly station, if the vacuum pump 293a supplying the vacuum to the pistons 271 fails and the back curves are not picked up, then the PLC will generate signals indicating correction or adjustment is needed. Similarly, if assembly vacuum chamber pressure is not within 1 to 7 mbars of pressure as measured by pressure sensor 225a, or, if the back curve lens molds are not placed on corresponding front curves at a controlled pressure of about 0.3 kgF, as measured by pressure sensor 225b, or, if the servomotor 277 does not lift the assembly at the correct rate of 0.2–1 mm/sec, then the PLC 102a will generate a negative status integer associated with the particular error for entry into the shift register STATUS_FRONT[9] indicating that a flawed FC pallet 12a exists that should later be rejected. Likewise, an error may occur with respect to a BC carrying pallet 12b and the status will be updated in shift register STATUS_BASE[9].

Lot Changeover Mode

Since it is necessary to produce contact lenses of varying degrees of power, new sets of power curves, i.e., front curve lens mold portions, produced by the injection mold assembly 20 are delivered to the pallets 12a in the manner described above. Since it is desirable to maintain steady state operation and keep interruptions to a minimum, the PLC 102b will flag the appropriate stations so that they may accommodate the new set of front curve lens mold portions to be processed. For e.g., it may be necessary to change the transport times within the nitrogen enclosure for a new set of front curve lens molds, or, it may be necessary to change the amount of monomer compound to be deposited in the front curve lens mold portions of a new lot. The master clock, as described above, will be reset for every lot changeover.

Pallet Rejection

Figure 13:
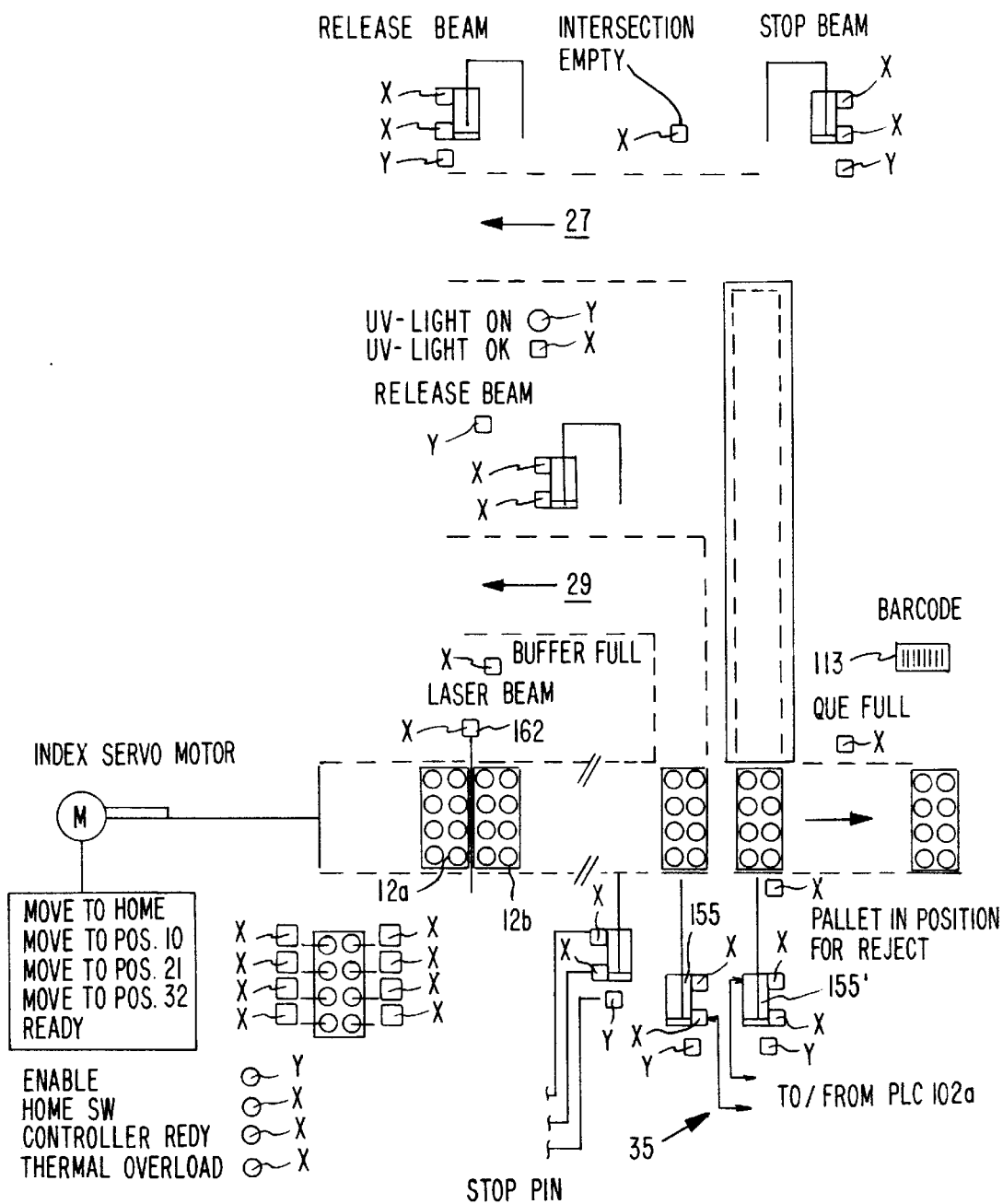
FIG. 13 is a schematic illustration of the apparatus for recirculating the empty pallets and rejecting the flawed after exiting the filling/molding station 50.

FIGS. 8 and 13 both illustrate the apparatus for automatically rejecting specific pallets at the exit of the filling/mold assembly station 50. After exiting the mold assembly module 59 of apparatus 50, the pallets 12b that had transported the back curve lens mold portions are empty and are recirculated back to the supply conveyor 29 to pick-up a new set of back curve lens molds from the injection mold facility 30. Given the alternating sequence of the pallets throughout the filling/assembly station and the time stamp information entered into the memory for each pallet 12b upon entry into the filling station 50, and the precise timing of the operations performed therein, the PLC will know when to initiate pallet rejection of the empty pallets 12b. Specifically, as shown in FIGS. 8 and 13, the pallet will enable ram assembly 35 having a reciprocating ram 155 and ram head 156 to push the empty pallet 12b from position indicated as "E" (FIG. 8) along conveyor 29b in the direction indicated by arrow "F" where the back curve supply conveyor 29 picks up the pallet 12b for recirculation to the back curve lens mold pick up point.

Additionally, as each of the pallets 12a carrying mold assemblies are indexed to a position indicated as position {11} in FIG. 8, the pallet ID and pallet status data are shifted from previous position {10}; i.e., ID_FRONT[11]:=ID_FRONT[10], STATUS_FRONT[11]:=STATUS_FRONT[10]. The PLC then makes a determination as to whether the pallet status stored in the variable STATUS_FRONT[11] is a negative number indicating a flawed pallet. If it is, then a second reciprocating ram 155' and ram head 156', shown in FIG. 8, is provided to push, in the direction indicated by arrow "F'", a pallet 12a containing flawed mold assemblies or front curve lens molds along conveyor 27b back to the front curve supply conveyor 27. This is done if the production line quality control system determines that an error has occurred during the processing from the mold injection assembly station up to and including the filling/mold assembly station 50. The PLC only knows if an error has occurred with respect to a particular process condition by checking the process condition status in the shift register at position {11}.

The contact lens production line facility includes a suction vent apparatus (not shown) for removing the mold assemblies from the rejected pallet 12a while being recirculated back to or while on front curve supply conveyor 27.

As shown in FIG. 1, after the empty pallets 12b are recirculated and the flawed pallets rejected, a new PLC 102b having associated memory 104b is provided for tracking the pallets 12a through the UV precure station 65, UV polymerization station 75 and demold station 90 of the production facility. Prior to entry into the UV precure station, the pallets 12a carrying mold assemblies pass under bar code scanner 113 where they are identified so that the PLC 102b may update the PALL_TIME and PALL_STATUS information for each. At this point in time, every PALL_ID_NUM read by bar code scanner 113 will be used as a pointer, and, the PLC will mate the status data STATUS_FRONT[11] status condition (ID_FRONT[11]) to each pallet ID identified by scanner 113 for entry into the corresponding PLC memory location in PALL_STAT array 170. Note that since PLC 102b takes over the control at UV precure, the pallet status information is input to array memory locations for PLC 102b memory. Additionally, the PALL_STATUS information for each identified pallet will indicate that the pallet is good upon entry into the precure station.

As shown in FIG. 1, the individual pallets 12a containing the eight contact lens mold assemblies leave the filling/mold assembly apparatus 50 on conveyor 32c before entering the precure assembly 65 where the front and back curve mold halves are clamped together in the precure step to displace any surplus monomer from the mold area and to properly align the mold halves by alignment of the mold flanges 131a,133a. While the mold halves are clamped under pressure, the polymerization mixture is then exposed to actinic light, preferably from a UV lamp.

Typically the mold halves are clamped for approximately 40 seconds with 30 seconds of actinic radiation. At the completion of the precure step, the polymerization mixture has formed a partially polymerized gel, with polymerization initiated throughout the mixture. Following the precure step, the monomer/solvent mixture is then cured in the UV oven apparatus 75 whereby polymerization is completed in the monomer(s). This irradiation with actinic visible or ultraviolet radiation produces a polymer/solvent mixture in the shape of the final desired hydrogel lens.

UV Precure and Polymerization Stations

As illustrated in FIG. 1, and described in further detail in co-pending patent application U.S. Ser. No. 08/257,786 entitled "Contact Lens Production Line Pallet System" now U.S. Pat. No. 5,744,357 the conveyor 32c delivers pallets 12a containing a plurality of molds to an accumulating section which assembles a plurality of pallets for a batch operation at the precure assembly 65 (FIG. 1). Accumulator section includes a holding mechanism that is timed by control means 100 to halt a lead pallet in place on the conveyor 32c and enable a twelve pallets carrying up to ninety-six (96) mold assemblies to be processed at the precure apparatus 65 in a batch mode for an extended period of time of 30 to 60 seconds.

Figure 14:
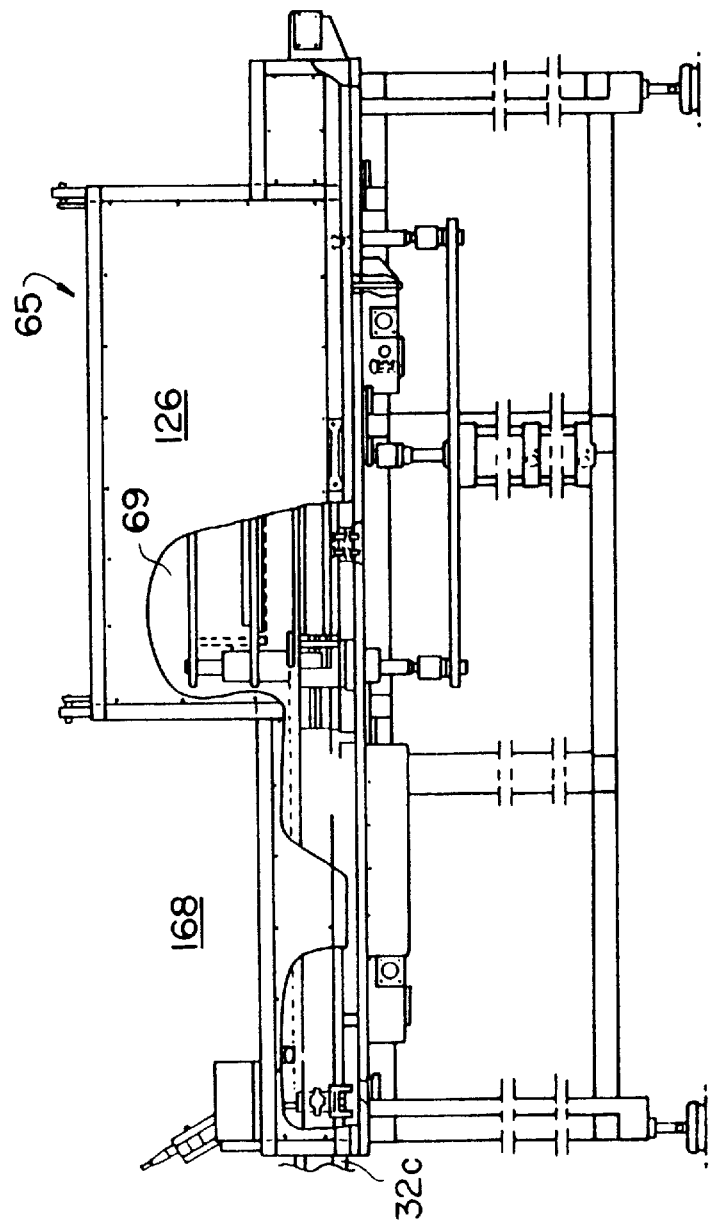
FIG. 14 is a side elevational view of the UV pre-cure station 65 showing nitrogen gas enclosure 126.
Figure 15:
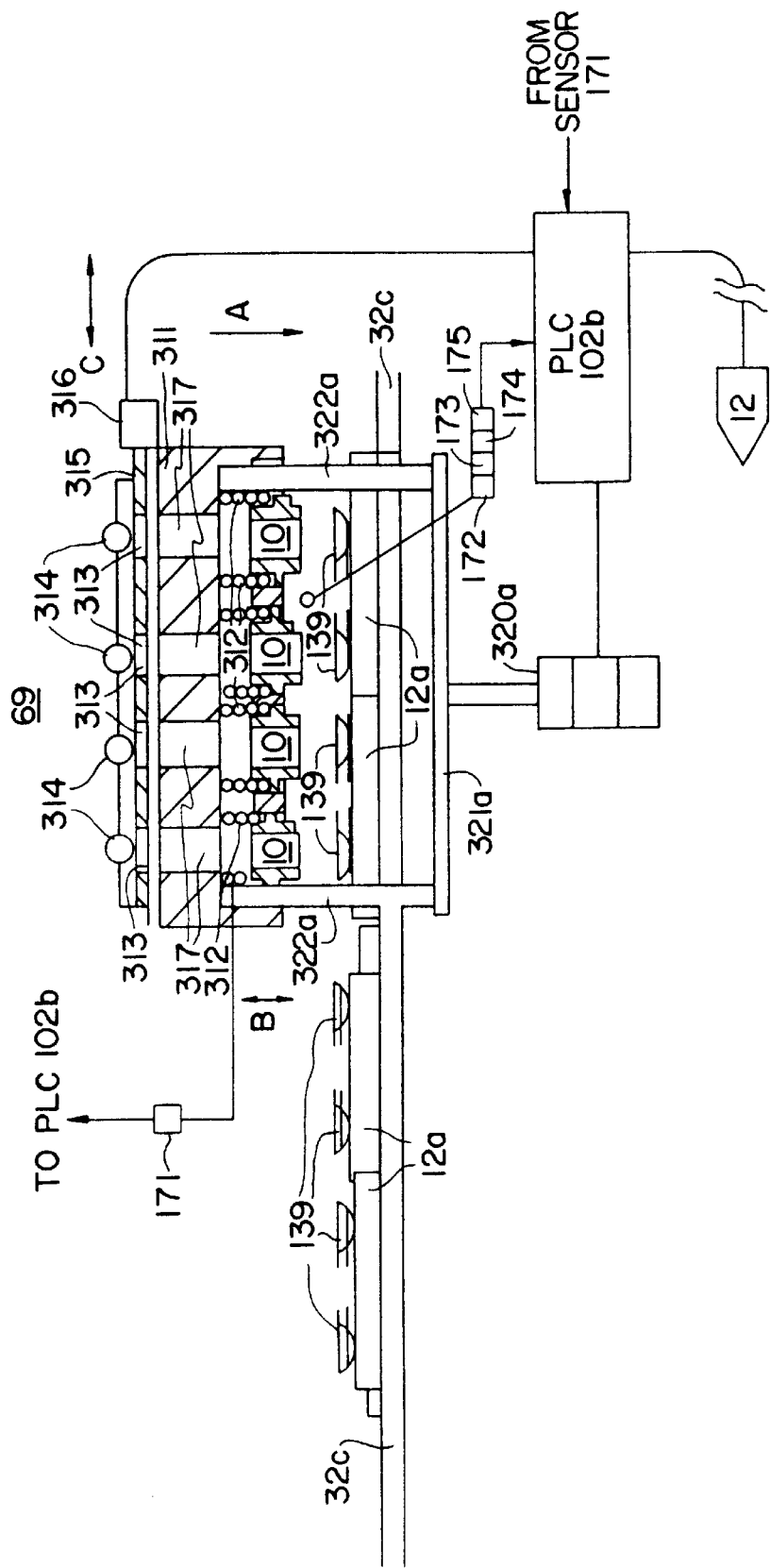
FIG. 15 is a detailed diagrammatic illustration of the pre-cure assembly 69 showing sensors 171–175 for monitoring UV pre-cure processes.

FIG. 14 illustrates a side elevation view of an embodiment of the precure apparatus 65. As illustrated in FIG. 14, the precure apparatus receives a plurality of pallets having a plurality of contact lens molds therein, from the infeed conveyor 32c. The infeed conveyor 32c delivers the pallets 12a and mold assemblies 139 to a low oxygen environment, which environment is accomplished by pressurizing an enclosure 126 with nitrogen gas. Prior to polymerization, the monomer is susceptible to oxidation from oxygen which results in degradation of the resultant lens. As shown in FIG. 15, a suitable sensor 175 is provided to monitor the percent oxygen concentration in precure apparatus 65, which, preferably, ranges from about 0.0% to 0.5%.

FIG. 15 is a diagrammatic representation of a portion of the precure assembly 69 of precure apparatus 65. As explained in further detail in co-pending patent application U.S. Ser. No. 08/257,792 entitled "Mold Clamping and Precure of a Polymerizable Hydrogel" assigned to the same assignee as the instant invention, the assembly 69 is raised and lowered into engagement with pallets containing contact lens molds by virtue of a pneumatic cylinder 320a which raises and lowers an intermediate support beam 321a and reciprocating shaft members 322a which are journaled for reciprocating support.

The assembly 69 includes multiple vertical reciprocal movements, a first one of which is in response to movement from air cylinder 320a and reciprocating beam 321a. As the precure apparatus 69 is lowered in the direction illustrated by arrow A, a plurality of annular clamping means 310 will engage the upper annular flange 133a of each of the mold halves contained within pallets 12a. The plurality of annular clamping means 310 are mounted on and travel with a reciprocating platform 311 of the apparatus, and are resiliently mounted therein for a second reciprocal movement along the directions of arrow B illustrated in FIG. 18.

Figure 18:
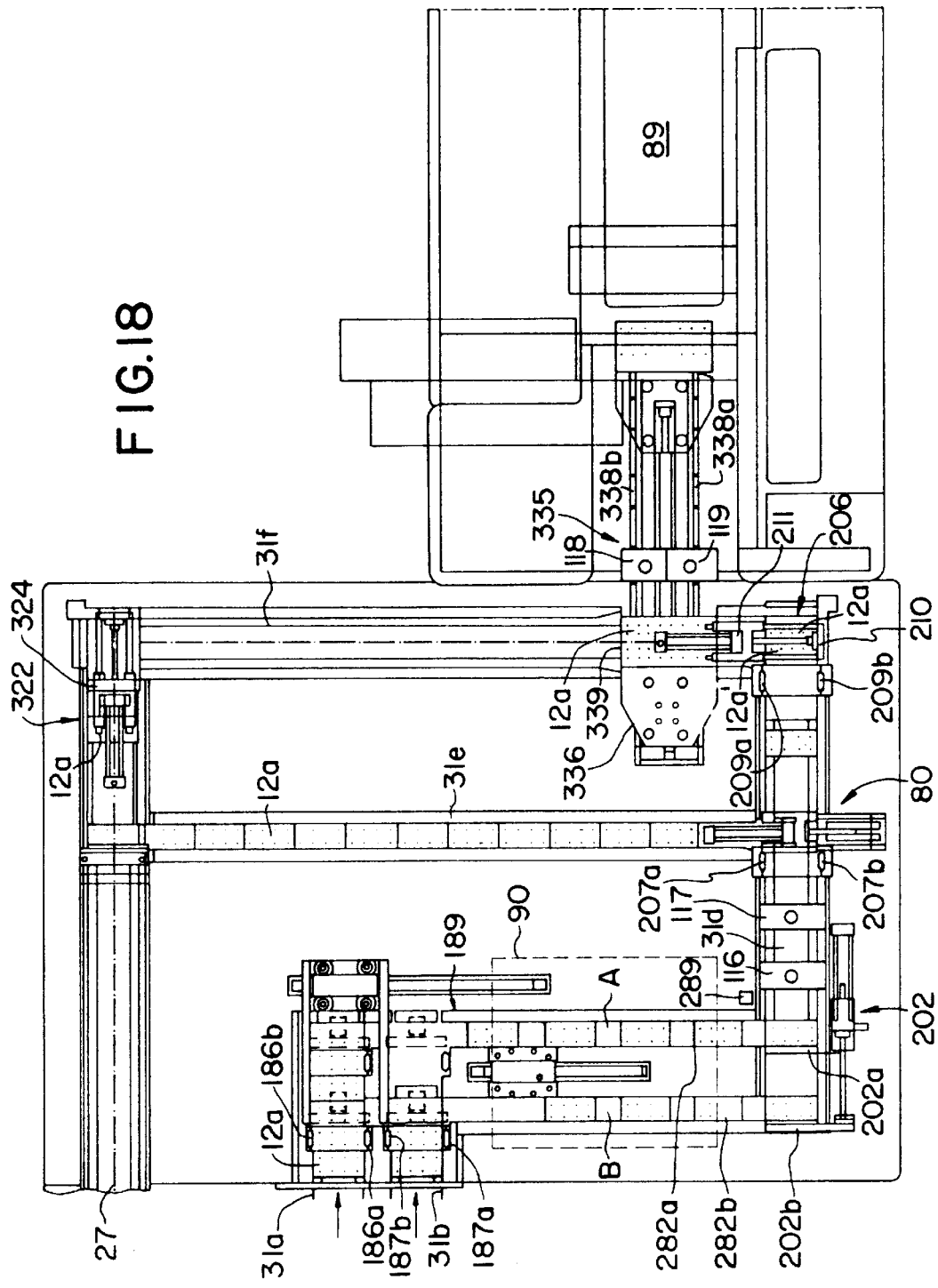
FIG. 18 illustrates a plan view of the back end of the production line pallet system showing the sequence for transferring pallets from dual conveyors 31a,b to the demold assembly, and the apparatus for transferring pallets from conveyor 31d to the transfer apparatus 335 for transferring the front curve mold halves which contain the polymerized lenses to the hydration chamber.

As illustrated in FIG. 18, the clamping means 310 are biased within frame 311 by springs 312 (illustrated diagrammatically) which may be an air spring or a helical spring. As the apparatus is lowered, the clamping means will engage and clamp the first and second mold halves together with the force determined by the spring means 312. Sensor means 171 are provided to monitor the force provided by each of the springs 312, although only one sensor is shown in FIG. 15. Ideally the curing force should range from 300 mBar –500 mBar of pressure. When air springs are used, the force will be determined by the amount of pressure provided to the air cylinder (not shown) and another sensor (not shown) is provided. While clamping means 310 have been illustrated as four members in FIG. 18 for illustrative purposes, it is understood that in the embodiment illustrated in FIG. 15 there are 96 individual clamping means, with an individual clamping means for each of the mold halves.

Positioned above the clamping apparatus are a plurality of actinic light sources 314 which may be UV lamps. After the clamping means has engaged the mold halves to clamp them together, a shutter mechanism 315 is opened by air cylinder 316 to enable the actinic light source 314 to initiate polymerization of the polymerizable composition in each of the mold assemblies 139. Shutter 315 has a plurality of openings 313 defined therein and is reciprocal along the x axis as indicated by arrow C in FIG. 15 in order to open and close exposure passage ways 317.

The operation of the precure apparatus 69 is controlled by PLC 102b which controls the duration of the clamping period by the length of time air cylinder 320a is activated to its reciprocal down position and also controls the amount of radiation received by the molds controlling the duration of the exposure period through operation of shutter 315 and the air cylinder 316. The intensity may also be manually adjusted by raising or lowering the lamps 314 with respect to molds 139.

The amount of force applied by clamping means 310, as measured by sensor means 171, may be varied from approximately 0.5 Kgf to 2.0 Kgf and is applied to keep the flange 133a of the second convex mold half parallel to the flange 131a of the first concave mold half for the duration of the exposure. The clamping weight is applied for 10 to 60 seconds, but typically for a period of 40 seconds by PLC 102b. After approximately 10 seconds of weight, actinic radiation from UV lamps 314 is applied to the assembled mold and the polymerizable monomer. Typically, the intensity of the UV light source is 2–4 mW/cm$^2$, and this intensity of light is applied for 10 to 50 seconds, but in the preferred embodiment, is applied for 30 seconds. Suitable sensors 172,173 are provided to monitor respective UV light intensity and exposure times and to inform the PLC 102b of any out of tolerance condition. It is understood that different intensities and exposure times could be used, including pulsed and cycled high intensity UV on the order of 10 to 150 mW/cm$^2$ with exposure times running from 5 to 60 seconds.

At the end of the radiation period, the shutter 315 is closed by reciprocating it to the right as illustrated in FIG. 15 and the weight is removed by energizing cylinder 320a to lift the precure assembly 69 upwardly by means of push rods 322a. As the assembly 69 is lifted, the clamping means 310 will be lifted clear of the molds and pallets to enable a batch pusher arm (not shown) to transport them out of the precure means. During the precure time, the temperature in the system may be varied from 30° to 50° C. and is monitored by sensor 174 interfaced with the PLC 102b.

At the conclusion of the precure process, the monomer has gone through initiation and some degree of polymerization. The resultant lens is in a gel state with some areas of the lens that have the least thickness, i.e., the edge, having a higher degree of polymerization than the body.

Tracking of pallet status information throughout the precure assembly 65 is also accomplished by a series of shift registers configured in three arrays named PALL_ID_IN [i], PALL_ID_PR[i], PALL_ID_UV[i] where i=1,2, . . . ,12 and represents the twelve pallets that are accumulated (PALL_ID_IN[i]) and batch processed within the precure station (PALL_ID_PR[i]). The information stored in each of the twelve registers PALL_ID IN[i] is pallet ID information as read bar code scanner 113 and simultaneously entered in PALL_ID_IN[i]. A pointer (not shown) to correctly load the shift registers with pallet ID information, is initialized to one (1) for the first pallet of each set of twelve pallets, and after each successful read of BCR 113, the pointer is incremented by one. As the twelve pallets 12a carrying more assemblies are conveyed in batch to the precure station 65 by a servo arm (not shown) as described in detail in above-mentioned co-pending patent application U.S. Ser. No. 08/257,786 entitled "Contact Lens Production Line Pallet System", now U.S. Pat. No. 5,744, 357, the pallet ID data is shifted by straight block assignment or in a loop from PALL_ID_IN to PALL_ID_PR, i.e., PALL_ID_PR[i]:=PALL_ID_IN[i ] for i=1, . . . ,12;

It should be understood that PALL_STATUS array 170 holds all the pallet status information.

As shown in FIG. 15, the sensors 171–175 are mounted at various locations inside the precure assembly 69 for monitoring the UV precure curing force, UV light activation, UV light exposure times, UV precure temperature, and oxygen levels, respectively, in the assembly. While being transported through the precure apparatus 65, any out of tolerance condition that is detected while the twelve pallets are in the precure station and while twelve pallets have been accumulated, may be related to only those twelve pallets identified to be within the precure apparatus at that time, or, may additionally be related to the twelve pallets that have also been accumulated for a total of twenty four pallets. The sensors 171–175 continuously signal the PLC to determine whether the respective precure process conditions are within their acceptable limits. If the process conditions are within these limits, then the PLC will update the process condition status PALL_STATUS[PALL_ID_NUM] for each of the twelve pallets identified by PALL_ID_PR[i] array at the exit of the precure apparatus to indicate that the pallets are good. For instance, a +3 integer value will be entered into array 170 locations indicating that pallets are good coming out of precure.

Since the PLC knows the identity of pallets present in the precure apparatus 65 at the time an out of tolerance process condition exists, for e.g., a bad UV bulb, or, exceeding maximum UV exposure time, etc., the PLC will immediately update the process condition status PALL_STATUS [PALL_ID_NUM] memory array 170 for each of the twelve pallets identified by PALL_ID_PR[i ] if the levels detected by sensors 171–175 are not within acceptable limits. The PLC may also update the process condition status PALL_STATUS[PALL_ID_NUM] memory array 170 for each of the twelve pallets identified by PALL_ID_IN[i] in addition to the twelve pallets identified by PALL_ID_PR [i], if, for e.g., the oxygen level exceeds an acceptable limit. For those pallets rejected as being flawed in the precure station, an integer status of –4, for example, will be entered into the corresponding locations in array 170.

After leaving the precure apparatus 65, the individual pallets 12a containing the eight contact lens mold assemblies enter the UV- polymerization assembly 75 on conveyor tracks 31a,b as shown in FIG. 1. As the set of twelve pallets are shifted out of the UV precure apparatus to the UV polymerization station 75, the pallet ID data is also shifted by straight block assignment from PALL_ID_PR[i] to PALL_ID_UV[i], i.e., PALL_ID_UV[i]:=PALL_ID PR[i] for i=1, . . . ,12.

Pallet ID data as pointed to by PALL_ID_UV[i], pallet status information and time stamp information for each pallet exiting precure is also entered into array 180 and 170, respectively, each time the PALL_ID_PR[i] information is shifted to PALL_ID_UV[i]. This is because, the PLC does not sense, via a bar code scanner, when pallets enter the UV cure ovens. Thus, tracking within the UV ovens can occur because the pallet ID information serves as both a pointer into arrays 170/180 and also as an indicator for when specific pallets enter the UV cure oven. As mentioned above, each pallet leaving the precure apparatus without error will have a pallet status condition of +3 in PALL_STATUS array 170.

Figure 16:
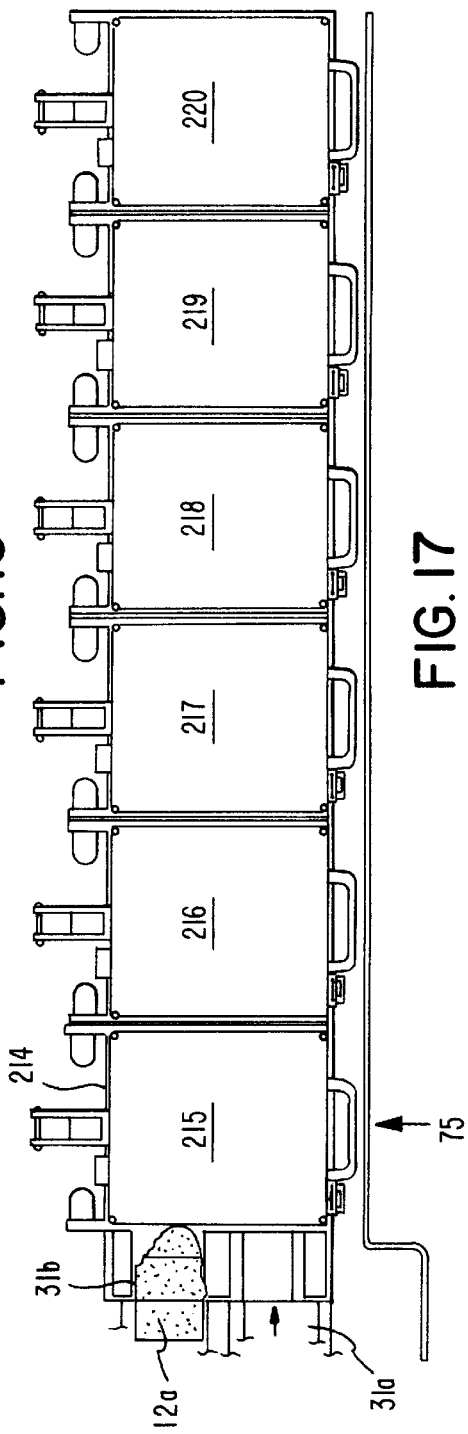
FIG. 16 is a top plan view of a UV curing tunnel in practicing the present invention, including a conveyor and a housing.

FIG. 16 illustrates a plan view of the UV-polymerization ovens. The individual mold assemblies 139 of polystyrene having the shape depicted in FIG. 2(b), and each having a monomer filled cavity are arrayed on each pallet 12a and conveyed through the polymerization tunnel 75 along two conveyors 31a,31b as shown in FIG. 1. As shown in FIG. 16, the UV Polymerization assembly 75 comprises a series of six housings arrayed side by side. Reference numeral 214 denotes generally a housing for a source which emits ultraviolet radiation as described herein. The housing 214 is disposed over the conveyors 31a,b so as to span the path of the conveyors. Housing 214 can comprise one unitary section or can be composed of several discrete sections arrayed side by side, as shown as units 215, 216, 217, 218, 219 and 220 in FIG. 16.

Figure 17:
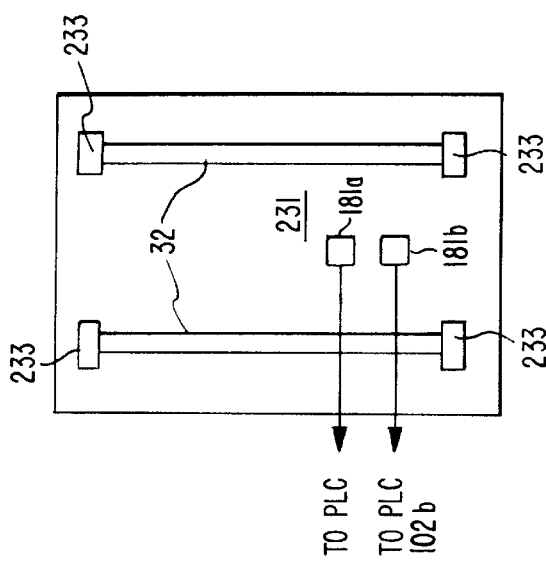
FIG. 17 is a view of the underside of the housing of FIG. 16.

FIG. 17 shows the underside of any of sections 215–220 of FIG. 16. That underside preferably has a flat horizontal surface 231 to which are affixed one or more elongated light bulbs 232 of the type commercially available for emitting ultraviolet radiation. FIG. 17 shows a multiplicity of bulbs, which is the preferred arrangement to use when several ranks of mold assemblies are disposed side-by-side on the conveyor. The bulbs are arrayed side by side, with their longitudinal axes parallel, and with those axes parallel to the direction of travel of the mold assembly. Each housing after the first holds ultraviolet-emitting bulbs arrayed longitudinally as shown in FIG. 17. Each bulb held in one housing is essentially collinear with a bulb in the adjacent housing or housings. All bulbs are mounted in their respective housings to lie in the same plane. The vertical distance from the plane of the pallet to the plane of the bulbs, in the first housing 216 that contains bulbs that the mold assemblies encounter, should be about 25 mm to about 80 mm. That vertical distance to the bulbs in the subsequently traversed housings 216–220 should be about 50 to about 55 mm.

Ducts blow heated air into each of the spaces under all six housings, including the one that has no ultraviolet-emitting bulbs. The preferred temperatures to maintain around the pallet under each housing are about 49° C. to about 64° C. under the first two housings, and about 49° C. to about 59° C. under the other four.

The rate at which the pallet travels is preferably sufficient so that the total time that elapses from the moment that a given mold assembly first enters under the first housing 216 until it emerges from under the last housing 220 is preferably about 300 to about 440 seconds.

By operating in this manner, the mold assembly is exposed to five cycles of increasing and decreasing ultraviolet radiation intensity. In each cycle, the intensity of the ultraviolet radiation ranges from about zero, up to about 3–3.5 mW/Cm$^2$, and then back to about zero. Since the bulbs are of essentially identical length and the pallet moves at a constant speed, each cycle lasts essentially the same length of time.

Suitable sensors interfaced with the PLC 102b are provided in each of the housings to monitor the UV light intensity and temperature within the apparatus 75. Two such sensors respectively indicated as 181a,b, are shown in housing 215 of FIG. 17.

As mentioned above, while being transported through the UV polymerization station 75, the Pallet status array 170 stores pallet ID information related to only those pallets identified to be within the apparatus at any one time. The sensors 181a–181b continuously signal the PLC 102b to determine whether the respective UV polymerization process conditions are within the above-described acceptable limits. If the process conditions are within their limits, then the PLC will update the process condition status PALL_STATUS[PALL_ID_NUM], array 170, for each pallet having a status code indicating that the pallet is within the UV oven (or, had successfully exited the precure station), to indicate that the pallets are good. If the process conditions are not within their limits, then the PLC will update the process condition status PALL_STATUS[PALL_ID_NUM] with a negative integer for each pallet identified in the array 170 as being present in the UV cure ovens to indicate that the pallets should be rejected as being flawed.

Upon exiting the tunnel, each pallet will be identified by respective bar code scanners 114 and 115 and the pallet status of each will be updated. Additionally, the PLC 102b will enter the time stamp for each pallet leaving the UV polymerization tunnel 75. Given the prior time stamp value generated by bar code scanner 113, the PLC 102b may readily determine the total transport time and maximum UV exposure time of each pallet 12a within the UV precure 65 and UV Polymerization 75 stations. With this information it can be additionally determined whether the transport times within each assembly are within acceptable limits. If the transport times are not found to be within the acceptable limits, the PALL_STATUS information for each pallet identified in the array 170 will be updated to indicate that there has been a mechanical breakdown or malfunction of a conveyor 31a,b and that the pallets 12a transported thereby are bad and should be no longer subject to processing.

After the polymerization process is completed, the two halves of the mold are separated during the demolding step leaving the contact lens in the first or front curve mold half, from which it is subsequently removed. It should be mentioned that the front and base curve mold halves are used for a single molding and then discarded or disposed of.

Demolding Station

As illustrated in FIG. 18, the pallets containing the polymerized contact lenses in the mold assemblies exit the polymerization oven apparatus along two conveyors 31a, 31b, as described above, and enter into the demold assembly 90. The pallets are transferred from their conveyors 31a,31b and positioned along reciprocating transport carriers 282a, 282b of a dual walking beam 189 the operation of which is described in detail in above-mentioned co-pending patent application U.S. Ser. No. 08/257,786 entitled "Contact Lens Production Line Pallet System", now U.S. Pat. No. 5,744, 357. Generally, the reciprocating carrier beam advances pallets 12a individually along a pair of tracking guide rails or shoulders (not shown) of respective guide tracks that mate with respective notches (not shown) of the pallet. The paired set of shoulders and respective guide rails notches of the pallet keep the pallet precisely aligned as it is being advanced by the carrier beam throughout the demold apparatus, and, further prevents any vertical movement of the pallet 12a when the mold assemblies 139 are de-molded.

Prior to demolding, as shown in FIG. 21, the PLC 102b makes a determination whether the individual contact lens mold assemblies 139 retained by each pallet 12a are properly seated within each lens mold cavity. This is accomplished by a decentration check which involves a laser sensor (not shown) that is similar to the filling and assembly laser which scans just above the pallet back curve surface to detect decentrated back curves of the mold assemblies and ensure that each mold assembly is seated in its recess within the prescribed limit of ±0.1 mm of its normally seated position. As an additional check, scope probes 291,292 may be inserted within the blind holes for visual investigation of each mold assembly 139. If it is determined that a particular lens mold assembly is decentered, or, that the lens mold halves of the mold assemblies have been formed out of alignment, then the particular PLC will update the status in a shift register for that particular location, as will be explained in detail below.

In the preferred embodiment described in detail above, the transport carriers of the dual walking beam carries the pallets containing contact lens mold assemblies to the demold apparatus where, preferably, the flange portions of the front curve and back curve mold halves are gripped and pulled away from each other, either in directly opposite directions or through an angle in a prying sort of motion. Advantageously, the contact lens mold assembly is first heated moderately to facilitate separation of the polymerized article from the mold half surfaces. As explained in further detail in co-pending patent application U.S. Ser. No. 08/258, 557 entitled "Mold Separation Apparatus", now U.S. Pat. No. 5,578,331 assigned to the same assignee as the instant invention, the disclosure of which is incorporated by reference herein, the demold apparatus 90 includes means for applying a precise amount of heat, which may be in the form of steam or laser energy, to the back curve lens mold portion of the contact lens mold assembly, prior to prying apart the back curve mold half from the front curve mold half by a set of pry fingers that are inserted within the gap formed between the overlying flange portions of each mold half of the mold assembly.

As shown in FIGS. 19(a) and 19(b), the demold assembly 90 is enclosed by an enclosure 280 and includes reciprocating beam 226 carrying two steam discharge assemblies 227a,227b, one assembly for each pallet 12a conveyed thereto by each transport carrier 282a,282b of dual walking beam 189. Each steam discharge assembly includes eight steam head nozzles (generally indicated 260) connected to a distribution manifold and a steam heat source (not shown), so that steam may be simultaneously applied to each of the mold assemblies on the pallet. To apply heat, the reciprocating beam 226 is extended from position indicated "A" in FIG. 19(a) to position indicated "A'" in FIG. 19(b) so that the steam head nozzles precisely engage their respective mold assemblies for applying steam under conditions controlled by PLC 102b. FIG. 19(b) shows only steam head assembly 227b in engagement with a pallet 12a. Additionally, as shown in FIG. 19(a), suitable sensors 281 interfaced with the PLC, are provided to measure the temperature of the demold apparatus enclosure 280. This enclosure is preferably maintained at a temperature ranging from 70° C. to 80° C.

A detailed front elevational view of a steam discharging assembly 227a is illustrated in FIG. 20 and is shown comprising a mounting head assembly 267 having a cover assembly 250, a steam distribution manifold 230 located immediately beneath cover assembly 250 for distributing steam from steam intake valve 266 to the eight individual steam nozzle assemblies 260, a condensate manifold 240 located immediately beneath steam distribution manifold 230 for removing and regulating the steam pressure applied to the back curve lens mold surface during steam impingement, and a retaining plate 261 for retaining the individual steam discharge nozzles 260 and the steam intake valve 266 in the apparatus. Also shown in FIG. 20 is steam intake valve 266 that is positioned within assembly 267 and in cooperative engagement with the steam and condensate manifolds 230,340. The steam intake valve 266 communicates with steam intake pipe 270 via plenum 269 to provide pressurized steam to the steam distribution manifold 230. Additionally, a vacuum source (not shown) is connected via suitable piping 287 to the condensate manifold 240 at input 286 to evacuate the steam and to regulate the steam pressure applied to the back curve lens mold surface during steam discharge.

Figure 19C:
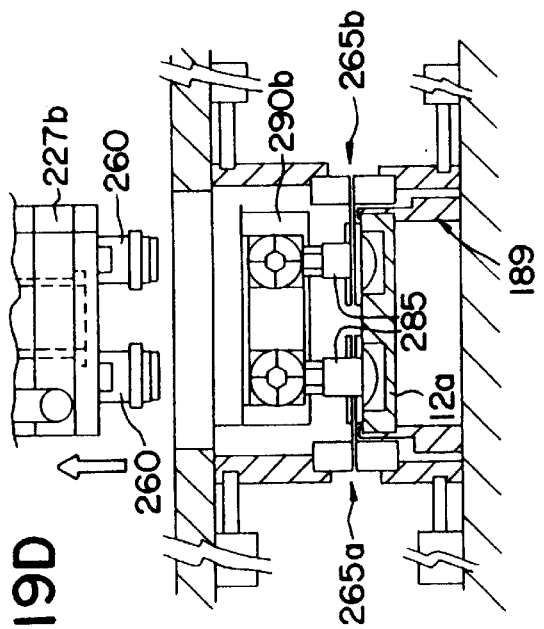
FIG. 19(c) illustrates the device with the steam nozzles engaging the mold parts and the pry fingers engaging the mold flanges.

The cover assembly 250, as illustrated in the front elevational view of FIG. 20, accommodates two heater cartridge inputs 253a,b connected with suitable heater cables 256a,b. As shown in FIG. 20, suitable sensors 288a,b are connected to cartridge heaters 253a,b, respectively, and interfaced with the PLC so that the temperature of each steam discharge unit may be monitored and regulated by the PLC 102b. In the preferred embodiment, the steam heat is regulated at temperatures ranging from 100° C. to 130° C., and, is discharged for a duration of time of approximately 0.4 to 0.6 seconds. The PLC 102b will take corrective action if the temperature of the steam exceeds a value of 120° C. and will indicate that a specific pallet is flawed if the back curve lens mold is subject to steam at a temperature in excess of 120° C. As shown in FIG. 19(c), during the time the steam discharge assemblies 227a,b and the steam nozzles 260 thereof discharge steam to the back curve of the individual lens molds, a set 265a of pry tools are extended, as indicated by the arrows, for insertion between the gaps formed between the respective front and back curves for each of the four lens molds situated on one side of the pallet 12a. Likewise, a set 265b of pry tools are extended for insertion between the gaps formed between the respective front and back curves of each of the four lens molds situated on the opposite side of the pallet 12a.

Figure 19D:
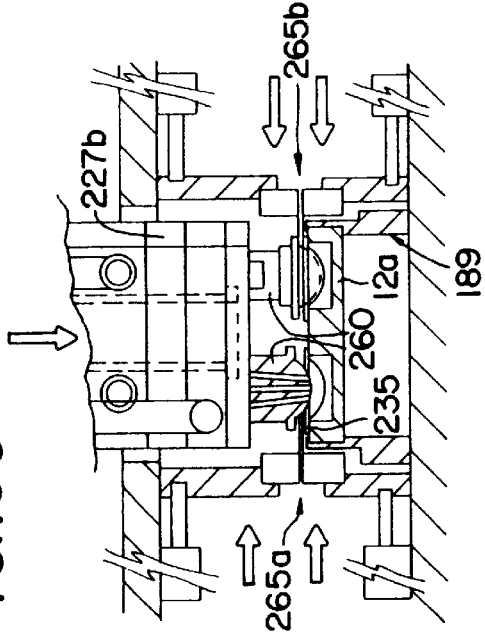
FIG. 19(d) illustrates the retraction of the steam nozzles, and engagement of the suction cup assembly.
Figure 19E:
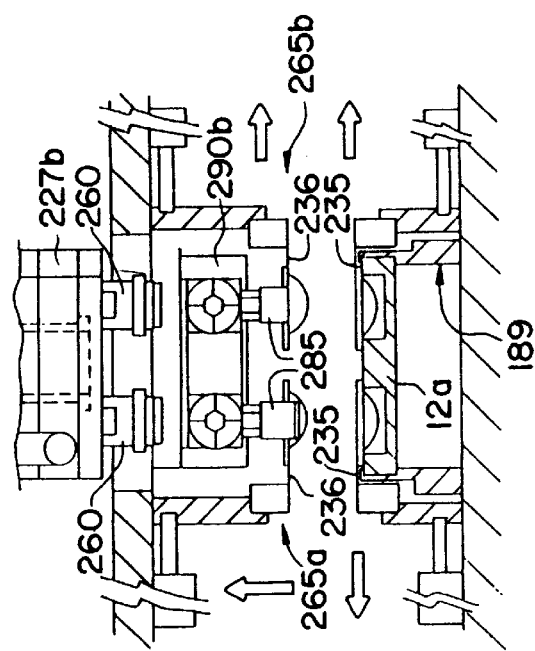
FIG. 19(e) illustrates the upward pry motion of the assembly to remove the back curve mold part from the front curve mold and molded lens.

As further illustrated in FIG. 19(c), each set of pry tools 265a,b are inserted in a manner such that fingers 235 of a bottom set of the pry tools thereof anchors the circumferential or annular rim portion 131c of the front curve of the lens mold to the surface of the pallet, and that fingers 236 of a top set of pry tools by action of pneumatic drive means (not shown) will vertically separate (FIG. 19(e)) the back curve mold portion of the lens mold from the front curve mold portion without destroying the integrity of the contact lens or either of the mold parts.

Next, as illustrated in FIG. 19(d), after discharging the precision controlled amount of steam, the steam discharge assemblies 227a,b and the steam nozzles 260 thereof are retracted by respective steam head retraction assemblies 252a,b (FIG. 19(b)) to enable the suction cup assembly unit 290b to align with the pallet 12a as shown. As shown in FIGS. 19(a) and 19(b), each suction cup assembly 290a,b is mounted for reciprocating movement on beam 226 and each contains eight suction cups (generally indicated as 285) for precise engagement with a corresponding mold assembly on the pallet when the steam discharge assemblies 227a,b are retracted.

During the mold separation step illustrated in FIG. 19(e), vacuum suction for the suction cup assembly 290b is activated, and the top group of pry tools having fingers 236 are caused to separate from the lower group of pry tools 235 by pneumatic drive means (not shown) to bias the circumferential edges of each of the back curves 133 of each lens mold away from each of the front curves 131 which retain a respective contact lens therein and are anchored by the lower group of pry fingers 235. Thus, the back curve lens molds 133 are effectively removed from their respective front curve lens mold portions and retained by individual suction cups 285.

Although not shown, the upper and lower sets of pry fingers 235,236 are finally retracted laterally in opposite directions indicated by the arrows in FIG. 19(e), to allow each pallet 12a now containing up to eight front curve lens mold portions and a respective contact lens therein, to continue along its respective conveyor path, while the suction cups 285 retain the corresponding individual back curve mold portions for disposal. Specifically, the suction cup assembly 290b is retracted to its original position and the vacuum may be removed therefrom so as to release the removed back curve lens mold portions. The separated back curve mold parts are dropped in a bin at the retracted position, and evacuated by a vacuum line (not shown) for disposal.

The demolding process occurs under precision control of the PLC 102b which also provides sensors for monitoring the demold time, i.e., the time that steam or laser heat is applied to the back curves, and for monitoring the time between the heating of the mold assemblies and the removal of the back curve mold halves therefrom, which, in the preferred embodiment, is approximately 2 seconds. Furthermore, after demolding, the laser sensing may again be initiated in the manner described above, to ensure that each back curve mold half has been removed from the mold assembly 139, and that the HEMA ring 132a is not present after back curve removal. All information regarding the result of the PLC determinations are stored in shift registers specific to each respective pallet at the exact position of occurrence. Later, the status and time arrays 170,180 are updated as the pallets reach bar code scanner 116 and the status stored in the shift register and prior status stored in the array 170 are married.

Tracking within the de-mold apparatus is accomplished by a set of shift registers software arrays named STATUS__A[i] and STATUS__B[i], where i=1, . . . ,8, and represent physical locations along dual walking beam rails indicated as A and B, respectively, within the demold apparatus shown in FIG. 18. Specifically, there is a total of eight pallets that may be indexed for processing within the demold apparatus at any one time. The data stored in the arrays represent the status information of each pallet as it is being processed and each index is initialized as having null status (zero). Pallet ID information for any pallet within the demold apparatus is not known because of the absence of a bar code scanner prior to pallets entry therein.

As a successful operation occurs within the demold apparatus, the shift register representing that particular pallet is updated with a commensurate status and that status data is shifted to the next index as the pallet is advanced. Thus, an assignment is performed: STATUS__A[i] STATUS__A [i—1] for all positions, i=2, . . . ,9. Likewise for the pallets being processed on the walking beam B; i.e., STATUS__B [i]:=STATUS__B[i—1] for all positions, i=2, . . . ,9. For instance, for a pallet on walking beam A, STATUS__A [8] will receive data from STATUS__A[7] after the last successful operation is performed on the pallet. If all the operations have been performed successfully at the demolder, then the status information STATUS__A[8] and STATUS__[8] will contain a unique positive number that will indicate that the pallet is good and should be transported to the hydration station.

After the last operation is performed and the pallets exit the de-mold apparatus, each pallet is scanned by bar code reader 116, and the pallet status data that is present in STATUS__A[8] and STATUS__B[8] will be mated with the PALL__ID__NUM as identified by the bar code scanner. A suitable proximity sensor 289 shown in FIG. 18, will confirm that a pallet from walking beam rail A (STATUS__A) will exit the demolder first and be identified by scanner 116. Thus, the unique status information stored in register STATUS__A[8] will be mated with the pallet status information already in pallet status array 170 for the pallet ID identified by bar code scanner 116. Likewise, status information stored in register STATUS__B[8] will be mated with the pallet status information already in pallet status array 170 for the pallet ID identified by bar code scanner 116.

If the process condition status information stored in STATUS__A[8] and STATUS__B[8] indicate good pallets, i.e., demold buffer temperature, steam heat temperature, and time between steam heat discharge and back curve removal were found to be within the acceptable limits, and, if the demolding process itself was successfully accomplished, i.e., all back curves removed, mold assemblies were not de-centered, and the HEMA ring not present, then the PLC 102b will update the process condition status PALL__STATUS[PALL__ID__NUM] (array 170) for each pallet identified by bar code scanner 116 accordingly (+'ive number). If the process conditions are not within their limits, then the PLC will update the process condition status PALL__STATUS[PALL__ID__NUM] for each pallet identified by bar code scanner 116 indicating that the pallets should be rejected as being flawed.

Additionally, the PLC 102b will enter the time stamp (into array 180) for each pallet leaving the demolding apparatus 90. Given the prior time stamp value generated by bar code scanners 114 and 115 the PLC may determine the total residence times within the de-mold buffer and check that they were within tolerable limits. If the transport times are not found to be within the acceptable limits, the PALL__STATUS information for each pallet identified by bar code scanner 116 will be updated to indicate that there has been a mechanical breakdown or malfunction of a conveyor 31a,b and that the pallets 12a transported thereby are bad and should be rejected.

As shown in detail in FIG. 18, bar code scanner 117 identifies each pallet exiting the demolding station on conveyor 31d, and, a process condition check for each identified pallet is made by the PLC 102b to determine if any pallets must be rejected as being flawed, or, may be transported to the hydration assembly 89 where PLC 102c will take over the control process.

Hydration Station

After the mold assemblies have been separated in the demold apparatus 90, each pallet containing the front curve mold halves with an exposed polymerized contact lens therein, are subsequently transported to a hydration assembly 89 as shown in the diagrammatic view of FIG. 1 and the detailed view of FIG. 18. As shown in FIG. 18, a dual pusher 20$_2$ having retractable arms 202*a,b* is provided to translate the motion of pallets 12*a* from each transport carrier 182*a,b*, respectively, of dual walking beam 189, to conveyor 31*d* for transport to the hydration chamber 89. Each pallet is first clamped between upstream clamping jaws 207*a,b* where the pallet is appropriately sensed by bar code scanner 117 to determine if the pallet has been flagged as being flawed. If the PALL_STATUS information indicates that a specific pallet is flawed for the reasons provided above, then that particular pallet and the contents therein are transferred from conveyor 31*d* to recirculating conveyor 31*e* by suitable pusher assembly 80 as shown in FIG. 18. The clamping jaws 207*a,b* release the rejected pallet and the pusher arm 80 pushes the rejected pallet to recirculating conveyor 31*e* where the rejected pallet is conveyed back to the front curve supply conveyor 27. As mentioned above, the contact lens production line facility includes a suction vent apparatus (not shown) for removing any mold assemblies that may be present in the rejected pallet 12*a* while being recirculated back to or while on the front curve supply conveyor 27.

If the pallets containing the demolded contact lens assemblies are not rejected, they are ready for hydration transfer and conveyed as pairs by conveyor 31*d* to a transfer pusher assembly 206 for transference to the hydration assembly 89 (FIG. 1). Prior to entering the transfer pusher 206, the upstream clamping jaws 209*a,b* temporarily clamp a first pallet to enable a second pallet to accumulate therebehind.

Figure 22A:
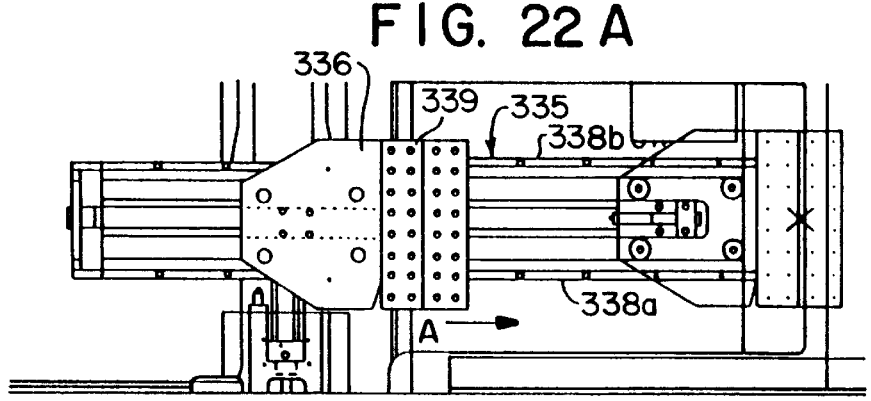
FIGS. 22(a)–22(c) illustrate the sequence for transferring pallets containing polymerized contact lens to the hydration apparatus 89.
Figure 22B:
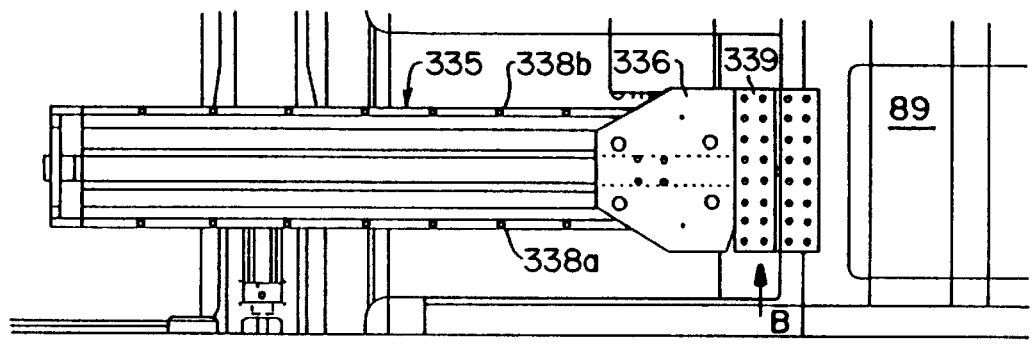
Figure 22C:
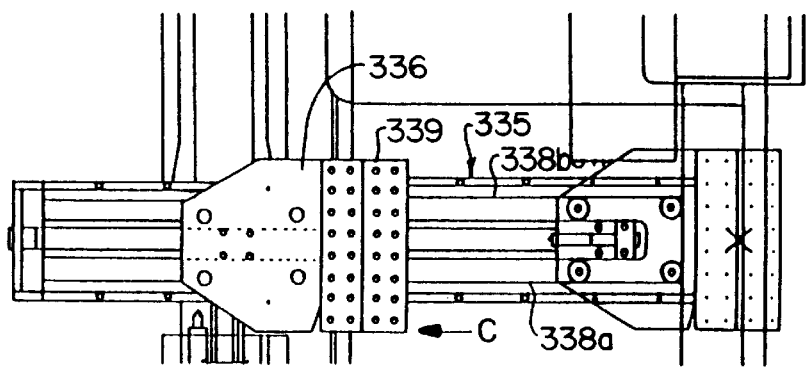

As controlled by PLC 102*c*, the clamped pallet is released for a time to enable two pallets indicated as 12*a*,12*a* ' to be forwardly conveyed for alignment with reciprocable pusher arm 210 of transfer pusher 206 as shown in FIG. 18. Drive means 211 then enables pusher arm 210 to push the two pallets to a transfer apparatus 335, and specifically, a pallet 336 having a flat plate portion 339, that accommodates up to two sets of two pallets each for transfer to the hydration chamber 89. After the first set of pallets is placed on plate 339, the pusher arm 210 is reciprocated to its original position (FIG. 18) to receive a second set of two pallets. The push arm 210 is then enabled to input the second set of two pallets onto the plate 339 of transfer pusher 336 causing the first set of pallets to advance on the plate. FIG. 22(*a*) shows the flat plate portion 339 of transfer pallet 336 containing four pallets that have been pushed thereto by pusher arm 210 two pallets at a time.

As shown in FIG. 18, the transfer pallet 336 is mounted for reciprocating horizontal movement on tracks 338*a,b*. In steady state operation, suitable drive means (not shown) enables transfer pallet 336 and plate 339 carrying four pallets to move across tracks 338*a,b* in the direction indicated by arrow "A" in FIG. 22(*a*) toward the hydration chamber assembly 89 until it reaches the hydration assembly transfer point indicated by the arrow labelled "B" in FIG. 22(*b*) where effective transfer of the front curve mold assemblies containing polymerized contact lenses to the hydration chamber takes place. The transfer of the front curve mold halves containing molded contact lenses is explained in the above-identified co-pending patent application U.S. Ser. No. 08/258,556 entitled "Automated Method and Apparatus for Hydrating Soft Contact Lenses", now U.S. Pat. No. 5,476,111 assigned to the same assignee as the instant invention. After the transfer pallet 336 reaches the transfer point a vacuum gripping matrix (not shown) of hydration assembly 89 is actuated to remove up to forty-eight front curve lens mold portions at a time from the four pallets on the transfer pallet 336 and transfer them to an appropriate receiving device located in a de-ionized water bath. The transfer pallet 336 and plate 339 carrying empty pallets 12*a* now reciprocates along tracks 338*a,b* in the direction indicated by arrow "C" in FIG. 22(*c*) back to its original position. The empty pallets are removed from plate 339 on to the return conveyor 31*f* when the incoming set of new pallets containing front curves are pushed onto the plate by pusher arm 210. Specifically, pusher arm 210 pushes a first set of new pallets 12*a* on the plate 339 to cause the first set of two empty pallets to exit the plate 339 and engage the conveyor 31*f* for recirculation back to the front curve pick-up point. Likewise, pusher arm 210 pushes a second set of new pallets 12*a* on the plate 339 which causes the first set of previously positioned new pallets to advance on the plate 339 and enable the second set of two empty pallets to exit the plate 339 and engage the conveyor 31f for recirculation to the front curve supply pick-up point. As illustrated in FIG. 18 the return conveyor 31*f* connects with the front curve supply conveyor 27 to return the empty pallets two at a time to the front curve pick-up point. Suitable pushing means 322 having reciprocating push arm 324 pushes the pallets onto the supply conveyor 27 where they are conveyed to the front curve injection mold assembly 20 to receive a new set of eight front curve lens mold halves in the manner described above.

As shown in FIG. 1, bar code scanners 118,119 are provided to initiate entry of time stamp information for each identified pallet 12*a* that enters the hydration station 89. The new time stamp information is compared with the previous time stamp values generated for the pallets by PLC 102*c* (bar code laser scanner 117) as they physically are handed off to the hydration apparatus. The PLC will thereby determine if the time between demolding of the mold assemblies and transfer of the lenses to the hydration station is between 20 to 40 minutes. Bar code scanners 118,119 will also make a redundant check for any failed (negative status) pallet that may not have been rejected.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

We claim:

1. A production line tracking and quality control system comprising:
    (a) a plurality of pallets, each of said pallets including a unique identification code and being operable to carry a group of one or more first contact lens mold halves or a group of one or more complementary second contact lens mold halves such that a single one of said pallets carries a respective one of said groups of contact lens mold halves throughout a contact lens fabrication facility;
    (b) a conveyor for transporting said pallets throughout said contact lens fabrication facility, said fabrication facility including one or more process stations; and
    (c) a controller separate from said pallets for providing real time monitoring of contact lens fabrication processes at said one or more process stations, said controller including means for identifying said unique identification code of each of said pallets at each of said one or more process stations, said controller receiving process condition values from said stations and generating process status information for each identified pallet responsive to process condition values received from said process stations, wherein said controller includes memory storage means having unique memory locations for storing said process status information corresponding to each of said pallets.

2. The production line tracking and control system according to claim 1 wherein said process status information comprises a reject flag when said process condition values are out of predetermined limits.

3. The production line tracking and control system according to claim 2 wherein said controller enables said conveyor to specifically reject and remove from further processing each identified pallet having process status information in the form of a reject flag.

4. The production line tracking and control system according to claim 1 wherein said controller generates time stamp information indicating a specific time each pallet is identified by said means for identifying said unique identification code at each said one or more process stations of said facility, each said time stamp information additionally stored in said unique memory location corresponding to each said identified pallet.

5. The production line tracking and control system according to claim 4 wherein said contact lens fabrication facility includes first means for depositing said one or more first contact lens mold halves on some of said pallets and second means for depositing said one or more complementary second contact lens mold halves on others of said pallets, said controller generating an initial time stamp value corresponding to the time of each deposit of said first and complementary second mold halves on their respective pallets.

6. The production line tracking and control system according to claim 5 wherein said one or more first contact lens mold halves and one or more complementary second contact lens mold halves are deposited on their respective pallets in an ambient air environment.

7. The production line tracking and control system according to claim 2 wherein said process status information further comprises an acceptance flag indicating that an identified pallet is acceptable for further processing at another station when said received process condition values are within predetermined limits.

8. The production line tracking and control system according to claim 1 wherein said means for identifying said unique identification code comprises a bar code reader.

9. A method of quality control for a contact lens fabrication facility, said fabrication facility including one or more process stations and a plurality of pallets for carrying contact lens mold portions throughout said fabrication facility, each of said plurality of pallets including a unique identification code, said method comprising the steps of:

(a) placing a group of one or more contact lens mold portions onto each of said pallets such that each of said pallets carries a respective one of said groups of contact lens mold portions throughout said fabrication facility;

(b) identifying said unique identification code of each of said pallets at each said one or more process stations of said facility;

(c) monitoring contact lens fabrication processes at said one or more process stations and communicating process condition values at each said one or more stations to a controller, said controller being separate from said pallets;

(d) generating process status information for each identified pallet responsive to process condition values received by said controller from said process stations; and (e) storing said process status information corresponding to each identified pallet in a memory storage means having unique memory locations corresponding to each said pallet.

10. The method of quality control for a contact lens fabrication facility according to claim 9 further including the step of generating time stamp information indicating a specific time each pallet identification code is identified at each said one or more process stations of said facility, and, storing each said time stamp information in one of said unique memory locations corresponding to each said identified pallet.

11. The method of quality control for a contact lens fabrication facility according to claim 9 further including the step of tracking a predetermined number of identified pallets within a process station of said facility at any one point in time, and storing the identity of each said pallet in one of said unique memory locations.

12. The method of quality control for a contact lens fabrication facility according to claim 9 wherein step (d) includes the step of generating a reject flag when said process condition values are out of predetermined limits.

13. The method of quality control for a contact lens fabrication facility according to claim 12 wherein step (d) further includes the step of generating an acceptance flag indicating that an identified pallet is acceptable for further processing at a subsequent said one or more stations when said process condition values are within predetermined limits.

14. The method of quality control for a contact lens fabrication facility according to claim 12 wherein said facility includes a conveyor for transporting said pallets throughout said facility, said method further including the step of rejecting specific pallets having process status information in the form of a reject flag by enabling said conveyor to remove said pallets at at least one predetermined rejection point.

15. The method of quality control for a contact lens fabrication facility according to claim 9 wherein said step of identifying said unique identification code is performed by a bar code reader.

* * * * *